(12) United States Patent
Koyama et al.

(10) Patent No.: US 7,942,338 B2
(45) Date of Patent: May 17, 2011

(54) SEMICONDUCTOR DEVICE

(75) Inventors: Jun Koyama, Kanagawa (JP); Toshihiko Saito, Kanagawa (JP)

(73) Assignee: Semiconductor Energy laboratory Co., Ltd. (JP)

( * ) Notice: Subject to any disclaimer, the term of this patent is extended or adjusted under 35 U.S.C. 154(b) by 0 days.

(21) Appl. No.: 12/369,212

(22) Filed: Feb. 11, 2009

(65) Prior Publication Data

US 2009/0236428 A1  Sep. 24, 2009

Related U.S. Application Data

(63) Continuation of application No. 11/005,458, filed on Dec. 6, 2004, now Pat. No. 7,494,066.

(30) Foreign Application Priority Data

Dec. 19, 2003  (JP) .................................. 2003-423861

(51) Int. Cl.
*G06K 19/05* (2006.01)
(52) U.S. Cl. ......................... 235/492; 235/487
(58) Field of Classification Search .................. 235/492, 235/486, 487
See application file for complete search history.

(56) References Cited

U.S. PATENT DOCUMENTS

| 6,055,201 | A | 4/2000 | Foss et al. |
| 6,072,345 | A * | 6/2000 | Ooishi ........................... 327/157 |
| 6,259,158 | B1 * | 7/2001 | Usami |
| 6,414,318 | B1 * | 7/2002 | Uber et al. ..................... 250/389 |
| 6,525,362 | B2 * | 2/2003 | Sadayuki |
| 6,525,595 | B2 | 2/2003 | Oku |
| 6,538,930 | B2 | 3/2003 | Ishii et al. |
| 6,690,955 | B1 | 2/2004 | Komiyama |
| 6,841,871 | B2 * | 1/2005 | Usami |
| 6,960,955 | B2 * | 11/2005 | Nonaka ......................... 327/536 |
| 7,167,154 | B2 * | 1/2007 | Sato et al. |
| 7,494,066 | B2 * | 2/2009 | Koyama et al. ............... 235/492 |
| 2001/0019511 | A1 | 9/2001 | Kondo et al. |
| 2001/0026187 | A1 | 10/2001 | Oku |
| 2003/0121985 | A1 | 7/2003 | Baldishweiler et al. |
| 2004/0102176 | A1 | 5/2004 | Hayashi et al. |
| 2005/0046464 | A1 | 3/2005 | Kobayashi et al. |
| 2005/0134463 | A1 | 6/2005 | Yamazaki |
| 2005/0174845 | A1 | 8/2005 | Koyama et al. |

(Continued)

FOREIGN PATENT DOCUMENTS

CN  1365147 A  8/2002

(Continued)

OTHER PUBLICATIONS

Office Action re Chinese patent application No. CN 200410101935.5, dated Jul. 4, 2008 (with English translation).

*Primary Examiner* — Daniel St.Cyr
(74) *Attorney, Agent, or Firm* — Husch Blackwell LLP

(57) ABSTRACT

The invention provides a circuit which provides a stabilized boosting in the case where a semiconductor device typified by a non-contact ID chip includes a circuit which requires a higher voltage than a logic circuit does. By inputting an alternating signal inputted from an antenna to a charge pump circuit as it is or through a logic circuit, a charge pump can operate with a stabilized frequency that a clock frequency is not affected by a variation of elements and the ambient temperature, thus a stabilized boosting can be provided.

16 Claims, 16 Drawing Sheets

U.S. PATENT DOCUMENTS

| | | |
|---|---|---|
| 2005/0180187 A1 | 8/2005 | Koyama |
| 2005/0210302 A1 | 9/2005 | Kato et al. |

FOREIGN PATENT DOCUMENTS

| | | | |
|---|---|---|---|
| EP | 1 034 942 A1 | * | 9/2000 |
| JP | 5-122108 | * | 5/1993 |
| JP | 6-28531 | | 2/1994 |
| JP | 6-150652 | | 5/1994 |
| JP | 11-46245 | | 2/1999 |
| JP | 2000-20665 | * | 1/2000 |
| JP | 2000-242754 | * | 9/2000 |
| JP | 2001-250393 | | 9/2001 |
| JP | 2002-150250 | * | 5/2002 |
| JP | 20003-202840 | * | 7/2003 |
| JP | 2003-339156 | * | 11/2003 |
| WO | WO 98/29261 A1 | * | 7/1998 |

\* cited by examiner

FIG.6
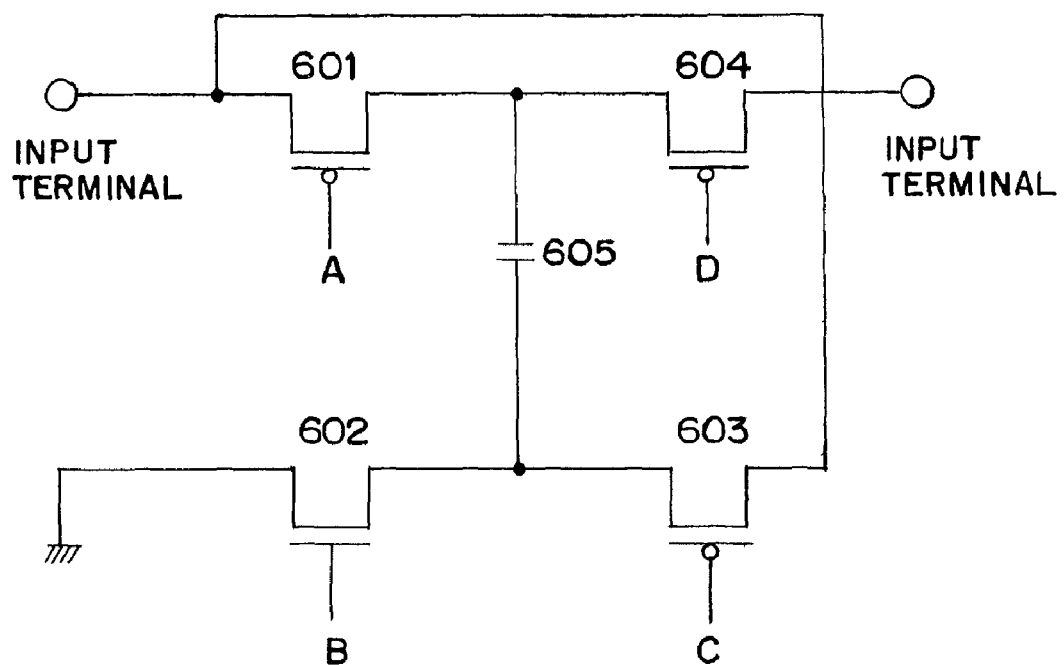
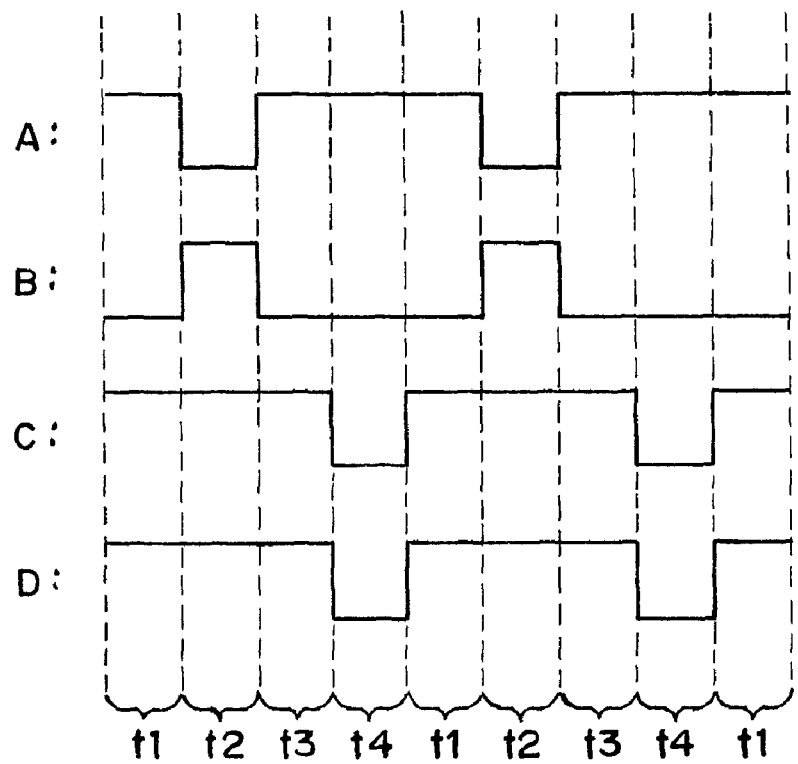

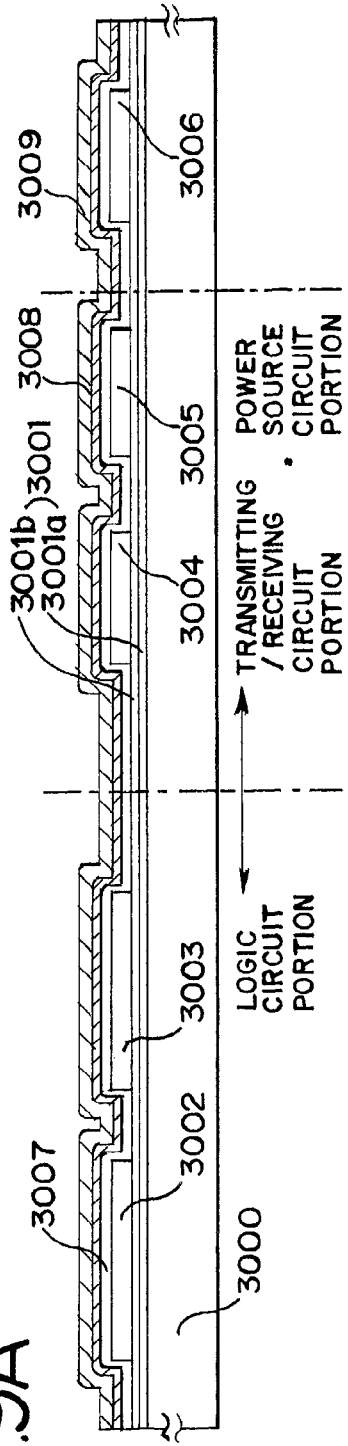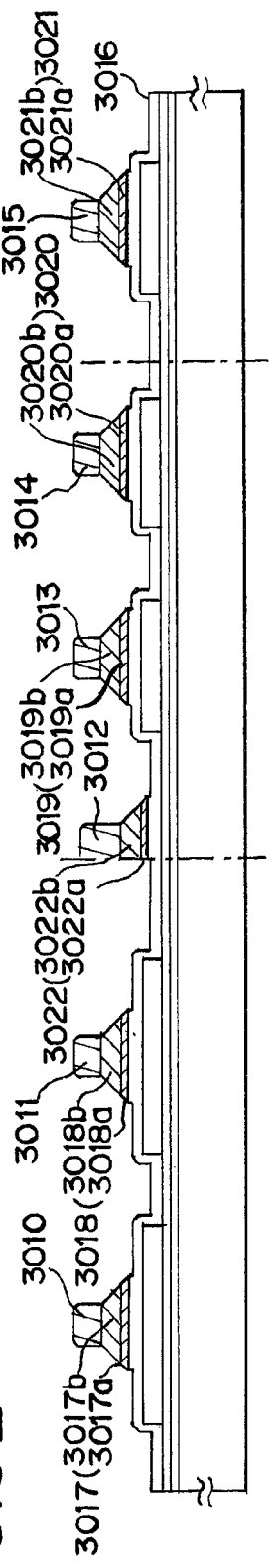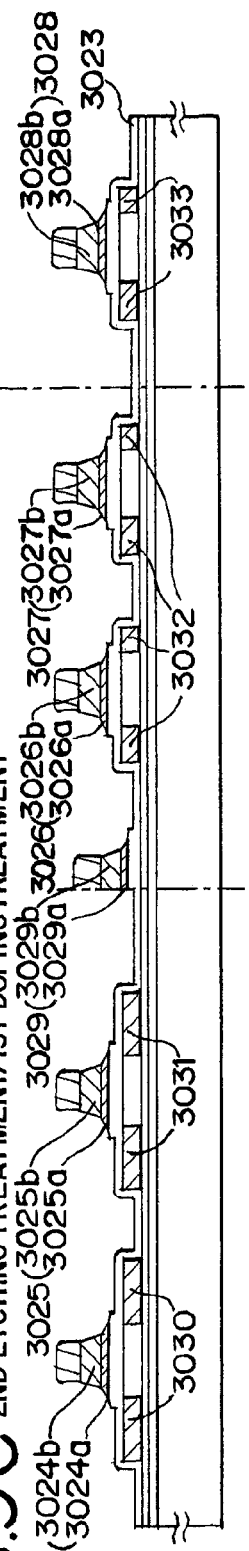

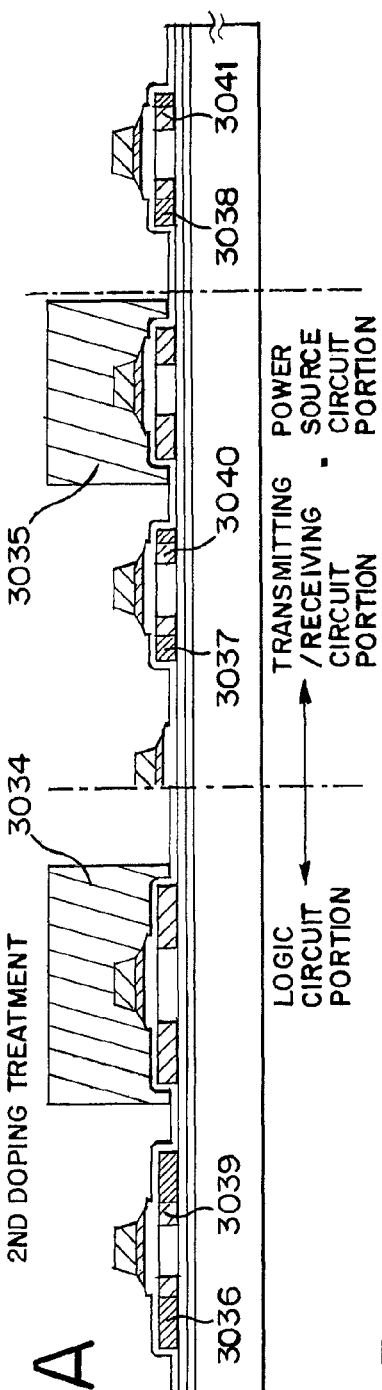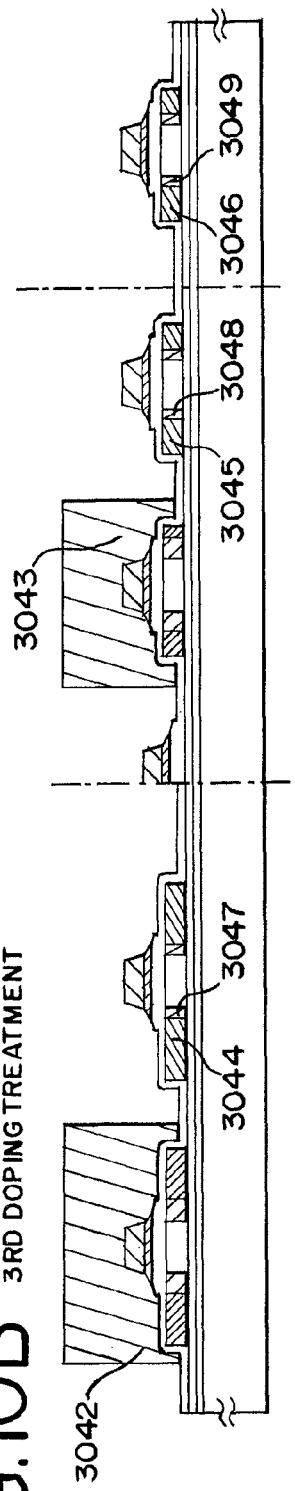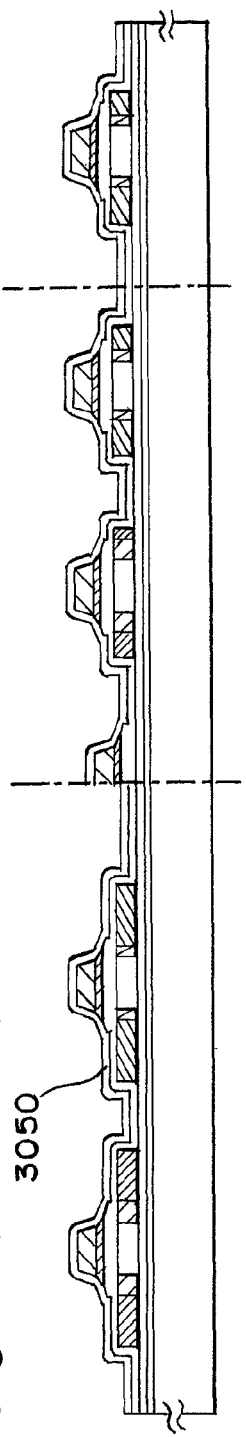

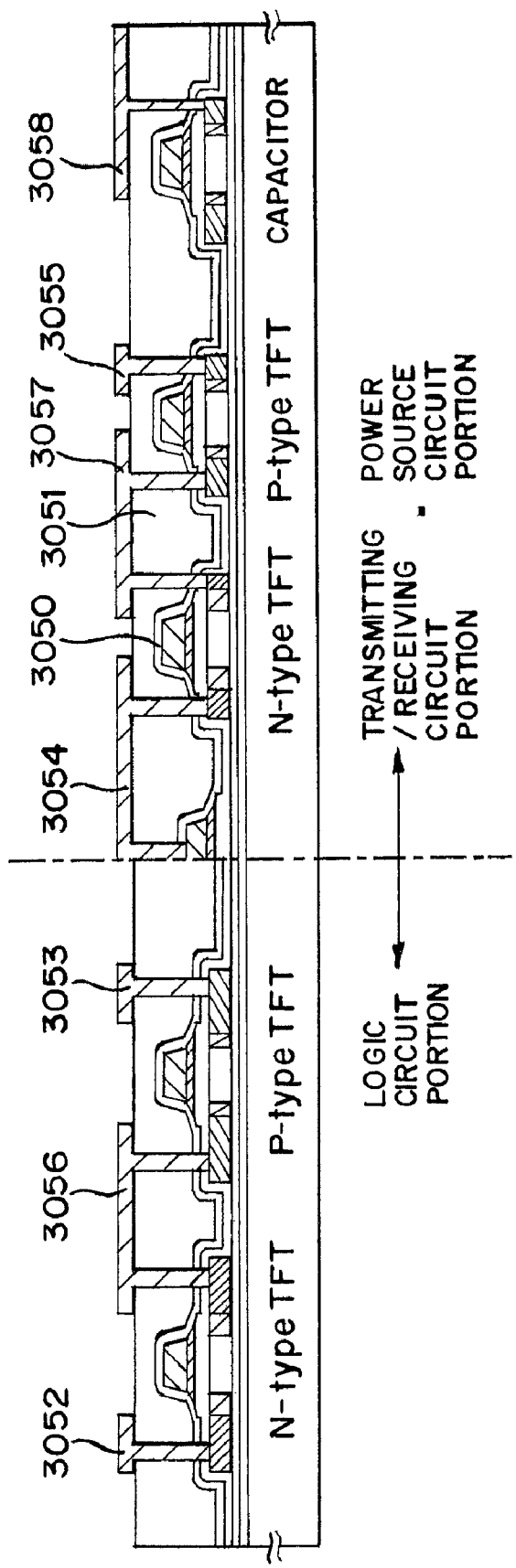
FIG. 11 FORMING 1ST AND 2ND INTERLAYER INSULATING FILM, AND ELECTRODES

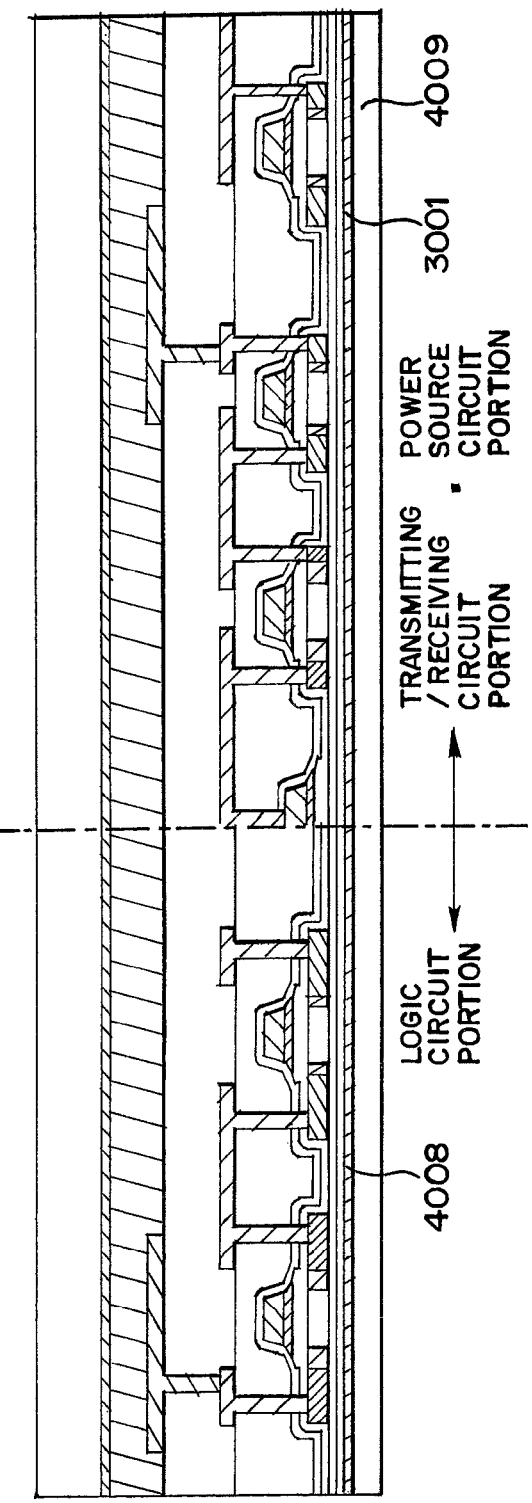
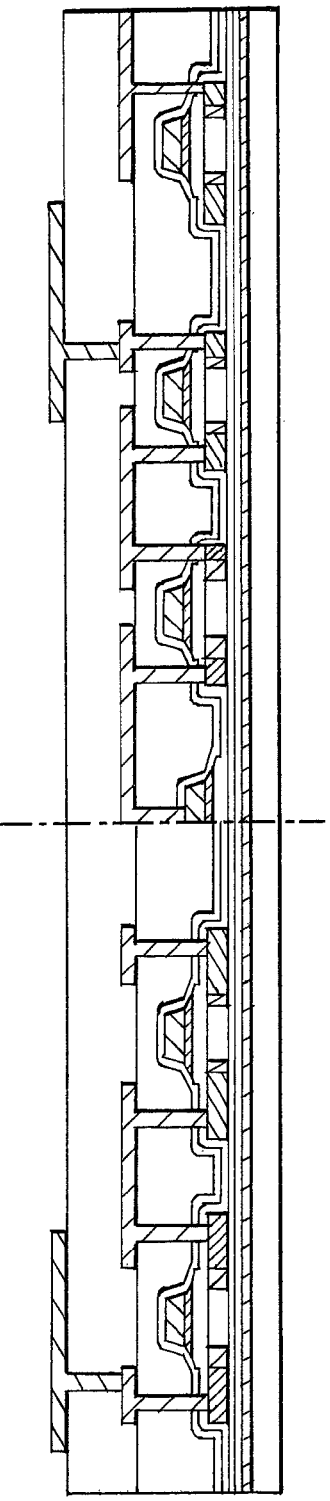
FIG.13A
FIG.13B

SEMICONDUCTOR DEVICE

This application is a continuation of U.S. application Ser. No. 11/005,458, filed on Dec. 6, 2004 now U.S. Pat. No. 7,494,066.

BACKGROUND OF THE INVENTION

1. Field of the Invention

The present invention relates to a semiconductor device used as an ID chip. In particular, the invention relates to a semiconductor device used as an ID chip formed on an insulating substrate such as glass and plastic.

In this specification, an ID chip refers to a semiconductor chip used for identification of an object, which is used for an IC tag, a wireless tag, a wireless chip, an RFID, an IC card and the like.

2. Description of the Related Art

As a computer technology and an image recognition technology advance, data recognition by using a medium such as a barcode is widely used for recognition of merchandise data and the like. It is expected that more amount of data recognition will be required in the future. On the other hand, when reading data with a barcode, there are such disadvantages that a barcode reader has to touch the barcode for reading and a barcode cannot store much data. Therefore, data recognition without contact and increase in memory size of a medium are demanded.

In response to such demands, an ID chip using an IC is developed in recent years. An ID chip stores required data in a memory circuit within an IC chip and the data is read out by using a non-contact means, that is generally a wireless means. It is expected that commercial distribution becomes simpler and cost is reduced by translating such an ID chip into a practical use.

FIG. 2 shows an example of such an ID chip technology. An IC chip 200 includes an antenna circuit 201, a rectifier circuit 202, a stabilizing power source 203, an amplifier 204, a divider circuit 205, a mask ROM 206, a logic circuit 207, and a switching transistor 208. Further, the antenna circuit 201 includes an antenna coil 210, a tuning capacitor 211, and a coupling capacitor 212. The rectifier circuit 202 is configured of diodes 213 and 214 and a smoothing capacitor 215.

An operation of such an IC tag is described now. An alternating signal received by the antenna circuit 201 is provided with a half-wave rectification by the diodes 213 and 214 and smoothed by the smoothing capacitor 215. This smoothed voltage includes a number of ripples, therefore, it is stabilized by the stabilizing power source 203 and the stabilized voltage is supplied to the amplifier 204, the divider circuit 205, the mask ROM 206, and the logic circuit 207. Note that the ripple corresponds to a difference between the highest voltage and the lowest voltage of a power source voltage. On the other hand, an alternating signal received in the antenna 201 is inputted to the divider circuit 205 through the amplifier 204, thereby divided. In the case where a signal received at an antenna is 13.56 MHz, the signal is divided into 8 and 16. Then, the divided signals are used for reading out the data stored in the mask ROM 206. Next, the data in the mask ROM 206 are processed in the logic circuit 207 of which output operates the switching transistor 208.

When the switching transistor 208 is turned ON, an output of the antenna circuit is grounded to GND, thereby impedance of the antenna is changed. Accordingly, a signal of an interrogator which is reflected on the antenna of an ID chip changes. When the interrogator reads this change, data stored in the mask ROM of the ID chip can be recognized. Note that such an ID chip incorporating an antenna is referred to as an RFID chip.

Further, a mask ROM is used as a ROM in the aforementioned example, however, a ROM such as an EEPROM which is rewritable is mounted and developed as well. FIG. 3 shows an example of an ID chip incorporating an EEPROM. An ID chip 300 shown in FIG. 3 includes an antenna circuit 301, a rectifier circuit 302, a stabilizing circuit 303, an amplifier 304, a divider circuit 305, an EEPROM 306, a logic circuit 307, and a switching transistor 308. Further, the antenna circuit 301 includes an antenna coil 310, a tuning capacitor 311, and a coupling capacitor 312. The rectifier circuit 302 includes diodes 313 and 314 and a smoothing capacitor 315.

An operation of the ID chip 300 is described now. An alternating signal received by the antenna circuit 301 is provided with a half-wave rectification by the diodes 313 and 314 and smoothed by the smoothing capacitor 315. This smoothed voltage includes a number of ripples, therefore, it is stabilized by the stabilizing power source 303 and the stabilized voltage is supplied to the amplifier 304, the divider circuit 305, the EEPROM 306, and the logic circuit 307. On the other hand, an alternating signal received by the antenna circuit 301 is inputted to the divider circuit 305 through the amplifier 304, thereby divided. In the case where a signal received at an antenna is 13.56 MHz, the signal is divided into 8 and 16. Then, the divided signals are used for reading out the data stored in the EEPROM 306. Next, the data in the EEPROM 306 are processed in the logic circuit 307 of which output operates the switching transistor 308.

When the switching transistor 308 is turned ON, an output of the antenna circuit 301 is grounded to GND, thereby impedance of the antenna is changed. Accordingly, a signal of an interrogator which is reflected on the antenna of an ID chip changes. When the interrogator reads this change, data stored in the EEPROM of the ID chip can be recognized.

When writing data into an EEPROM, a voltage higher than a normal operation voltage is required. In FIG. 3, an alternating signal is generated by using a ring oscillator 316. By using the alternating signal, a charge pump 309 is operated to boost an output of the stabilizing power source 303 to be used in the EEPROM.

Patent Document 1 is an example of such an ID chip.
[Patent Document 1]
Japanese Patent Laid-Open No. 2001-250393

SUMMARY OF THE INVENTION

These and other objects, features and advantages of the present invention will become more apparent upon reading of the following detailed description along with the accompanied drawings.

A conventional semiconductor device for an ID chip as described above has a following problem. A ring oscillator in general connects an odd number of inverters 401 to 409 in a shape of ring as shown in FIG. 4, of which output is taken out by a buffer circuit 412 formed of inverters 410 and 411.

In a charge pump circuit using the ring oscillator shown in FIG. 3, an oscillation frequency of the ring oscillator changes due to a variation in characteristics (for example, a threshold voltage and the like) of transistors which form the ring oscillator. Further, characteristics of transistors changes due to the ambient atmosphere as well, therefore, the oscillation frequency changes accordingly. In this manner, a cycle that the charge pump operates changes as the oscillation frequency changes. Therefore, an output voltage of the charge pump circuit changes in some cases. Such a change leads to change a power source of an EEPROM and the like and disturbs a stable operation thereof.

According to the invention, a high voltage power source used for an EEPROM and the like is stabilized in a semiconductor device used for an ID chip.

In order to solve the aforementioned problem, a following measure is taken in the invention. A clock signal used for the charge pump circuit is generated not from the ring oscillator but by using an alternating signal inputted from the antenna circuit.

With such a structure, the invention comprises a power source circuit, a transmitting and receiving circuit, a logic circuit, a memory, a charge pump, and an antenna circuit. The power source circuit and the transmitting and receiving circuit are electrically connected to the antenna circuit, the transmitting and receiving circuit is electrically connected to the memory and the logic circuit, and the power source circuit is electrically connected to the transmitting and receiving circuit, the memory, the logic circuit, and the charge pump. An alternating signal received by the antenna circuit is rectified in the power source circuit, then a signal boosted in the charge pump is inputted to the memory.

Further, a power source circuit, a transmitting and receiving circuit, a logic circuit, a memory, a charge pump, and an antenna circuit are provided in the semiconductor device of the invention. The power source circuit and the transmitting and receiving circuit are electrically connected to the antenna circuit, the transmitting and receiving circuit is electrically connected to the memory and the logic circuit, the power source circuit is electrically connected to the transmitting and receiving circuit, the memory, the logic circuit, and the charge pump. A first signal received by the antenna circuit and rectified by the power source circuit and a second signal received by the antenna circuit and processed by the transmitting and receiving circuit are used for inputting a third signal boosted by the charge pump to the memory.

Further, a power source circuit, a transmitting and receiving circuit, a logic circuit, a memory, a charge pump, a display device, and an antenna circuit are provided in the semiconductor device of the invention. The power source circuit and the transmitting and receiving circuit is electrically connected to the antenna circuit, the transmitting and receiving circuit is electrically connected to the memory and the logic circuit, the power source circuit is electrically connected to the transmitting and receiving circuit, the memory, the logic circuit, and the charge pump. An alternating circuit received by the antenna circuit is rectified by the power source circuit and boosted by the charge pump. Then, the boosted signal is inputted to the memory and the display device.

Further, a power source circuit, a transmitting and receiving circuit, a logic circuit, a memory, a charge pump, a display device, and an antenna circuit are provided in the semiconductor device of the invention. The power source circuit and the transmitting and receiving circuit are electrically connected to the antenna circuit, the transmitting and receiving circuit is electrically connected to the memory and the logic circuit, and the power source circuit is electrically connected to the transmitting and receiving circuit, the memory, the logic circuit, and the charge pump. A first signal received by the antenna circuit and rectified by the power source circuit and a second signal received by the antenna circuit and processed by the transmitting and receiving circuit are used for inputting a third signal boosted by the charge pump to the memory and the display device.

Note that the display device uses a liquid crystal, a light emitting element, or an electrophoresis element.

Further, a fourth signal which is an alternating signal received by the antenna circuit and processed by the transmitting and receiving circuit is inputted to the memory.

Further, the memory is an EEPROM.

Further, the charge pump includes a plurality of diodes and a plurality of capacitors connected in series, and an inverter. Each of the plurality of diodes is electrically connected to the capacitor. A signal inputted to the charge pump and an inverted signal of the aforementioned signal by the inverter are boosted by being inputted to one end of the capacitor which is not connected to the diode.

Further, the charge pump includes first to fourth transistors and a capacitor. An input terminal thereof is electrically connected to the first transistor and the third transistor, the first transistor is electrically connected to the capacitor and the fourth transistor, one end of the second transistor is grounded while the other end is electrically connected to the third transistor and the capacitor, and the fourth transistor is connected to an output terminal. By inputting a plurality of signals inputted to the charge pump into the first to fourth transistors, the signals inputted to the input terminal are boosted.

Further, at least one of the power source circuit, the transmitting and receiving circuit, the logic circuit, the memory, and the charge pump is formed of a thin film transistor.

Further, the antenna circuit, the power source circuit, the transmitting and receiving circuit, the logic circuit, the memory, and the charge pump are integrally formed on the same insulating substrate.

Further, the power source circuit, the transmitting and receiving circuit, the logic circuit, the memory, and the charge pump are integrally formed on the same first insulating substrate. The antenna circuit is formed on a second insulating substrate.

Further, the insulating substrate is an insulator of glass, plastic, or film.

Further, the antenna circuit is superimposed with at least one of the power source circuit, the transmitting and receiving circuit, the logic circuit, the memory, and the charge pump.

Further, a signal inputted to the antenna circuit is a wireless signal.

Further, the invention provides an IC card, an ID tag or an ID chip having the aforementioned features.

Note that a "power source circuit" in this specification refers to a rectifier circuit which rectifies and converts an alternating signal into a direct voltage, and a stabilizing power source circuit which stabilizes a power source outputted from the rectifier circuit. Further, "transmitting and receiving" circuit refers to an amplifier, a divider circuit, a transistor which changes an output of the antenna circuit and the like. Moreover, a "display device" includes a display portion using a liquid crystal, an organic EL element, an electrophoresis element and the like, and a driver circuit thereof.

In the semiconductor device of the invention, by generating a clock signal for a charge pump circuit by using an alternating signal inputted from an antenna circuit, a stabilized boosting can be performed without being affected by a variation in characteristics of transistors. Further, a stabilized boosting can be performed without being affected by ambient temperature.

BRIEF DESCRIPTION OF THE DRAWINGS

FIG. 6 is a diagram showing a circuit configuration of a charge pump.

FIGS. 9A to 9C are diagrams showing a manufacturing process of the semiconductor device of the invention.

FIGS. 10A to 10C are diagrams showing a manufacturing process of the semiconductor device of the invention.

FIG. 11 is a diagram showing a manufacturing process of the semiconductor device of the invention.

FIGS. 13A and 13B are diagrams showing a manufacturing process of the semiconductor device of the invention.

DETAILED DESCRIPTION OF THE INVENTION

Figure 1:
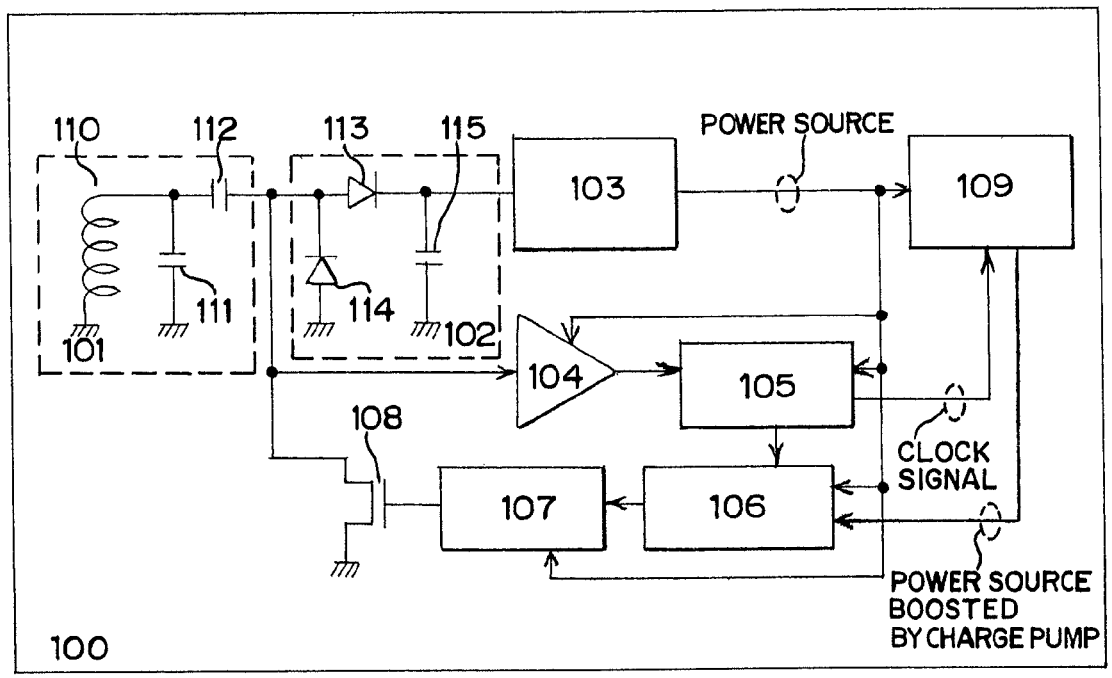
FIG. 1 is a block diagram showing a configuration of the semiconductor device of the invention.
Figure 2:
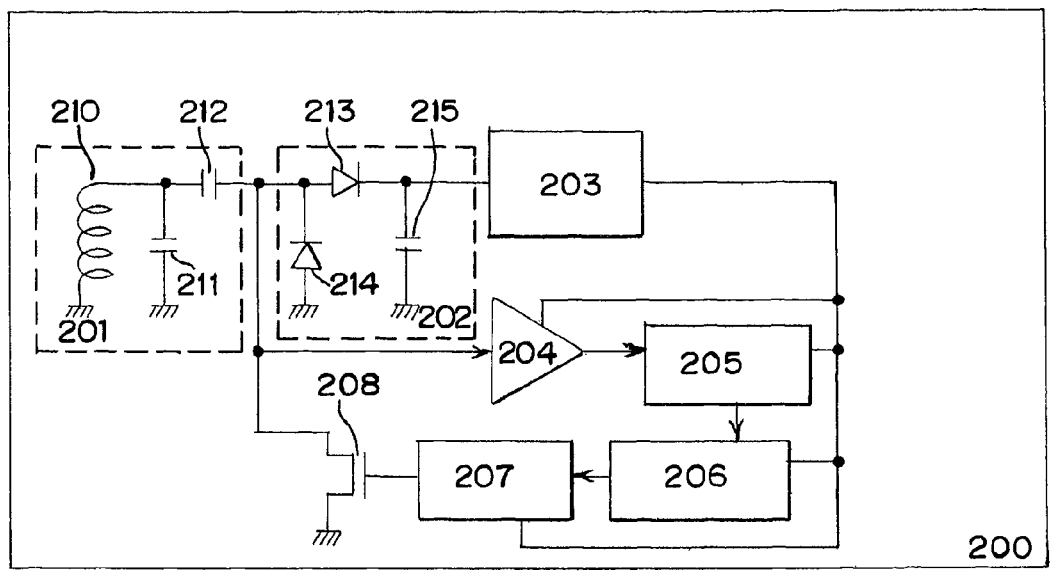
FIG. 2 is a block diagram showing a configuration of a conventional semiconductor device.
Figure 3:
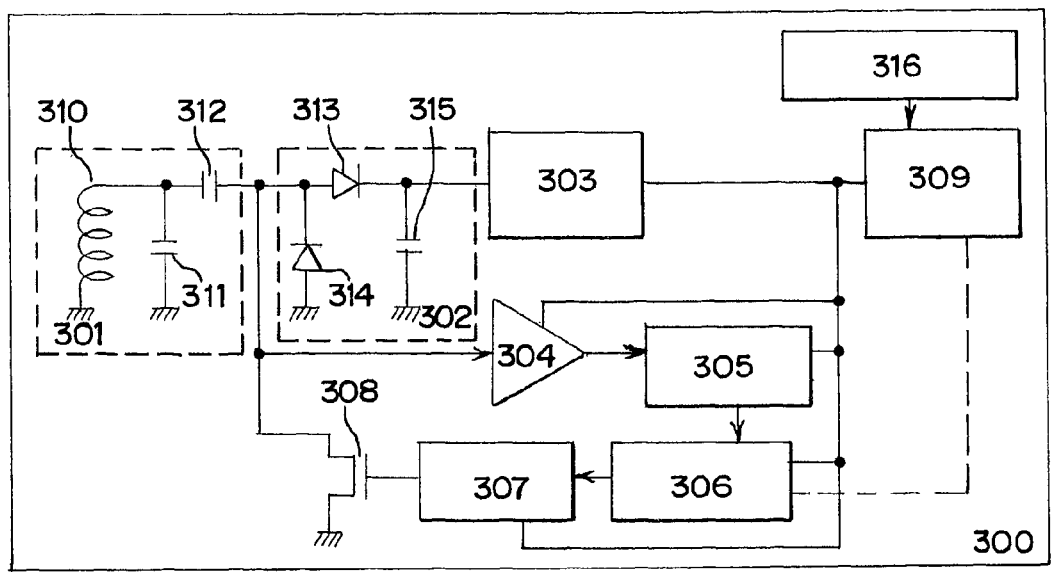
FIG. 3 is a block diagram showing a configuration of a conventional semiconductor device.
Figure 4:
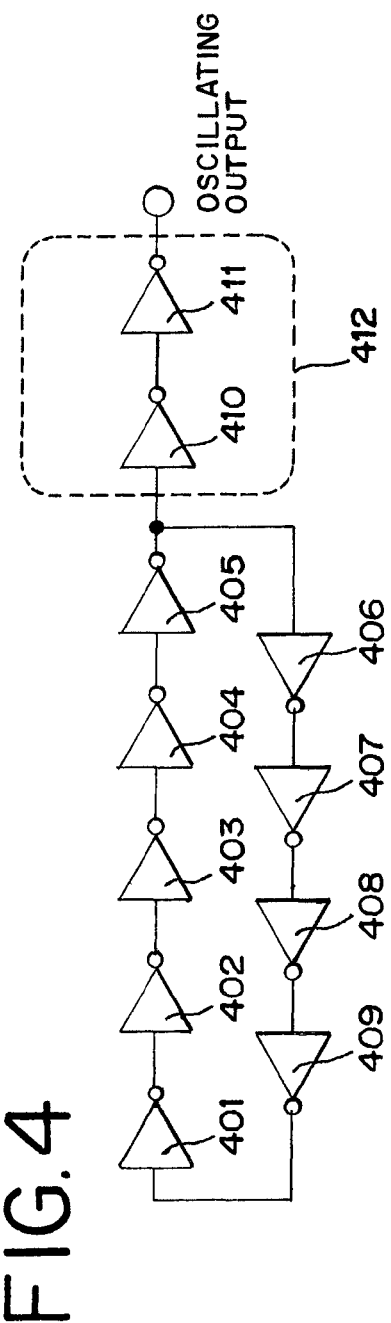
FIG. 4 is a diagram showing a circuit configuration of a ring oscillator.

Although the invention will be fully described by way of example with reference to the accompanying drawings, it is to be understood that various changes and modifications will be apparent to those skilled in the art. Therefore, unless such changes and modifications depart from the scope of the invention, they should be construed as being included therein. Note that identical portions in embodiment modes are denoted by the same reference numerals and detailed descriptions thereof are omitted.

The semiconductor device of the invention is hereinafter described.

In FIG. 1, a semiconductor device 100 used for an ID chip includes an antenna circuit 101, a rectifier circuit 102, a stabilizing power source 103, an amplifier 104, a divider circuit 105, a non-volatile memory 106, a logic circuit 107, a switching transistor 108, and a charge pump 109. Further, the antenna circuit 101 includes an antenna coil 110, a tuning capacitor 111, and a coupling capacitor 112. The rectifier circuit 102 includes diodes 113 and 114, and a smoothing capacitor 115. In embodiment mode shown in FIG. 1, the antenna circuit is formed on the semiconductor device, however, the invention is not limited to this and the antenna circuit may be connected to the semiconductor device externally.

A diode used in this circuit may be a TFT element which is diode-connected. Further, capacitors 507 to 512 may be directly formed on the substrate or provided externally. The capacitor provided externally may have any form but it is preferable to use a chip capacitor in view of circuit scale used for an ID chip. Note that the example described with reference to FIG. 1 is only an example and a circuit configuration, the material and the number of the diodes and capacitors are not limited to these.

An operation of such a semiconductor device is hereinafter described. An alternating signal received by the antenna circuit 101 is provided with a half-wave rectification by the diodes 113 and 114 and smoothed by the smoothing capacitor 115. This smoothed voltage includes a number of ripples, therefore, it is stabilized by the stabilizing power source 103 and the stabilized voltage is supplied to the amplifier 104, the divider circuit 105, the mask ROM 106, and the logic circuit 107. On the other hand, an alternating signal received by the antenna 101 is inputted to the divider circuit 105 through the amplifier 104, thereby divided. In the case where a signal received at an antenna is 13.56 MHz, the signal is divided into 8 and 16. Then, the divided signals are used for reading out the data stored in the mask ROM 106. Next, the data in the mask ROM 106 are processed in the logic circuit 107 of which output operates the switching transistor 108.

When the switching transistor 108 is turned ON, an output of the antenna circuit is grounded to GND, thereby impedance of the antenna is changed. Accordingly, a signal of an interrogator which is reflected on the antenna of an ID chip changes. When the interrogator reads this change, data stored in the mask ROM of the ID chip can be recognized.

Generally, writing to a non-volatile memory requires a higher voltage than reading. Therefore, reading may be performed at a stabilized voltage by the stabilizing power source 103, however, writing is required to be performed by using an output voltage of the stabilizing voltage source 103 boosted by the charge pump 109. Also, in the case of using a display device using a liquid crystal and the like, a high voltage is required for driving, therefore, a power source boosted by the charge pump 109 is used.

In the case of writing to a non-volatile memory, an output voltage of the stabilizing power source 103 boosted by the charge pump 109 is used. A clock signal for driving the charge pump is generated by using an alternating signal inputted from an antenna, without a ring oscillator shown in the conventional example. In FIG. 1, an alternating signal is divided to be inputted to a charge pump as a clock, however, it may be inputted directly to the charge pump or through a logic circuit.

An alternating signal inputted from the antenna is fixed in frequency by a standard. Therefore, a frequency does not vary due to a variation of transistors as in the conventional example or due to an ambient temperature. In this manner, a stabilized boosting is realized which results in a stabilized writing.

Embodiment 1

An embodiment mode of the invention is hereinafter described.

Figure 7:
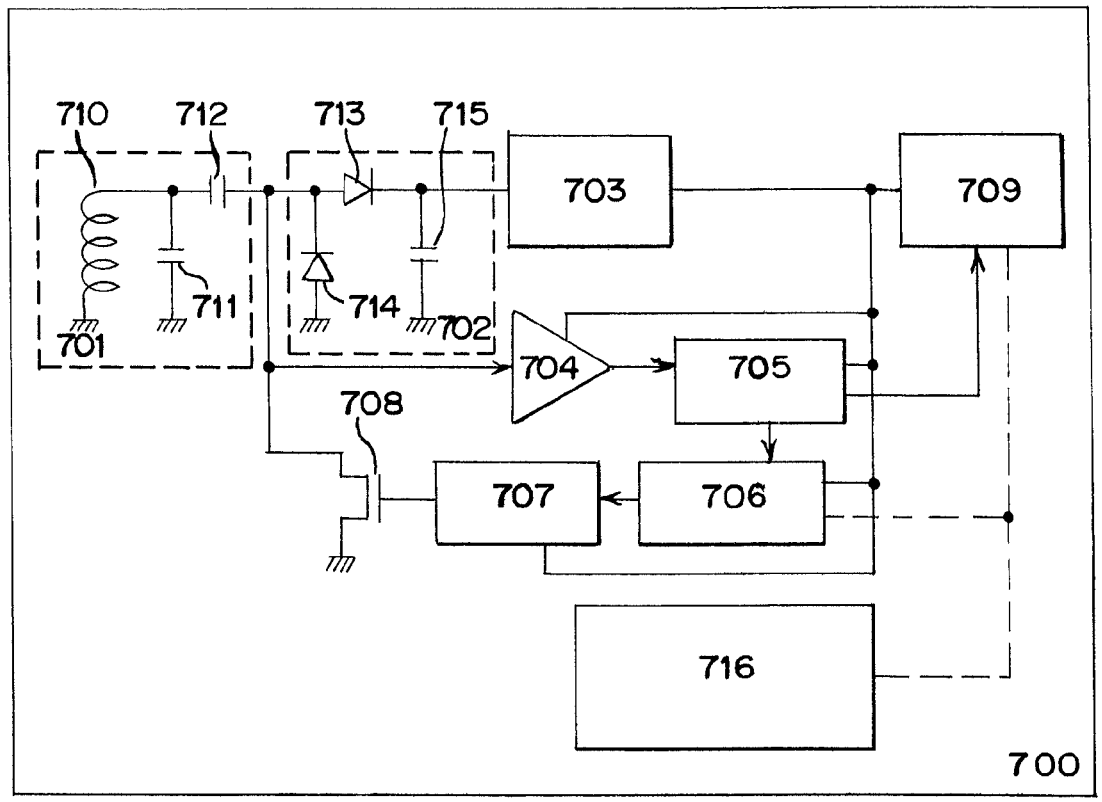
FIG. 7 is a block diagram showing a configuration of the semiconductor device of the invention.

In FIG. 7, a semiconductor device 700 used for an ID chip includes an antenna circuit 701, a rectifier circuit 702, a stabilizing power source 703, an amplifier 704, a divider circuit 705, a non-volatile memory 706, a logic circuit 707, a switching transistor 708, a charge pump 709, and a display portion 716. Further, the antenna circuit 701 includes an antenna coil 710, a tuning circuit 711, and a coupling capacitor 712. The rectifier circuit 702 includes diodes 713 and 714, and a smoothing capacitor 715. In embodiment mode shown in FIG. 7, the antenna circuit is formed on the semiconductor device, however, the invention is not limited to this and the antenna circuit may be connected to the semiconductor device externally.

The display portion 716 may be a display portion using a liquid crystal, a light emitting element such as an organic EL element, an electrophoresis element and the like, however, other elements may be employed as well. A display material which forms these display portions generally require a driving voltage higher than that of an LSI, which is often higher than 10 V. Therefore, boosting is required in an operation of a display portion as well. The display portion 716 may display contents stored in the non-volatile memory or data transmitted by the interrogator.

An operation of such an ID chip is hereinafter described. An alternating signal received by the antenna circuit 701 is provided with a half-wave rectification by the diodes 713 and 714 and smoothed by the smoothing capacitor 715. This smoothed voltage includes a number of ripples, therefore, it is stabilized by the stabilizing power source 703 and the stabilized voltage is supplied to the amplifier 704, the divider circuit 705, the non-volatile memory 706, and the logic circuit 707. On the other hand, an alternating signal received by the antenna 701 is inputted to the divider circuit 705 through the amplifier 704, thereby divided. In the case where a signal received at an antenna is 13.56 MHz, the signal is divided into 8 and 16. Then, the divided signals are used for reading out the data stored in the non-volatile memory 706. Next, the data in the non-volatile memory 706 are processed in the logic circuit 707 of which output operates the switching transistor 708.

When the switching transistor 708 is turned ON, an output of the antenna circuit 701 is grounded to GND, thereby impedance of the antenna is changed. Accordingly, a signal of an interrogator which is reflected on the antenna of an ID chip changes. When the interrogator reads this change, data stored in the non-volatile memory 706 of the ID chip can be recognized.

In the case where the display portion performs a display, an output voltage of the stabilizing power source 703 boosted by the charge pump 709 is used. A clock signal for driving the charge pump is generated by using an alternating signal inputted from an antenna, without a ring oscillator as shown in the conventional example. In FIG. 7, an alternating signal is divided to be inputted to a charge pump as a clock, however, it may be inputted directly to the charge pump or through a logic circuit.

An alternating signal inputted from the antenna is fixed in frequency by a standard. Therefore, a frequency does not vary due to a variation of transistors as in the conventional example or due to an ambient temperature. In this manner, a stabilized boosting is realized which results in a stabilized writing.

Also, this embodiment can be implemented in combination with the structure of embodiment mode.

Embodiment 2

Figure 5:
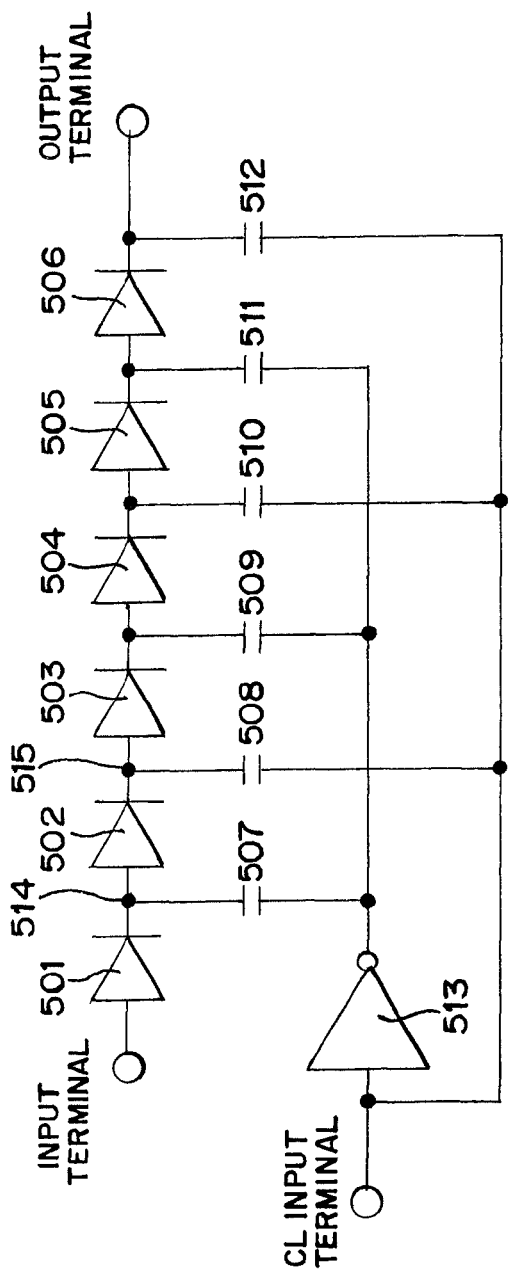
FIG. 5 is a diagram showing a circuit configuration of a charge pump.

FIG. 5 is an embodiment of a charge pump circuit.

A charge pump circuit shown here includes six diodes 501 to 506, capacitors 507 to 512, and an inverter 513. By inputting a clock signal in the case where an input voltage is VIN and a forward voltage of the diode is VF, a voltage of (VIN-VF).times.6 can be obtained as an output.

Here, a signal received by the antenna circuit in FIG. 1 or a signal received by the antenna circuit 101 and amplified by the amplifier 104 to be inputted to the divider circuit 105, thereby divided can be used as a clock signal.

An operation of the charge pump circuit is described briefly with reference to FIG. 5. Clock signals are inputted to one ends of the capacitors 508, 510, and 512 through a CL input terminal, while signals inverted by the inverter 513 are inputted to one ends of the capacitors 507, 509, and 511.

An anode and a cathode on the basis of the diode 502 are denoted by 514 and 515 respectively. The anode 514 and the cathode 515 are supplied with charges respectively by a clock signal and an inverted signal thereof. When a potential difference between the anode 514 and the cathode 515 exceeds the forward voltage VF of the diode, a current flows and the voltage at the cathode side is boosted. Here, a voltage to be boosted is (VIN-VF).

In the case where a plurality of circuits are connected in series, a voltage of an output is boosted by (VIN-VF) as a current flows through one circuit. As six diodes are connected in series in the case of FIG. 5, an output is boosted by (VIN-VF).times.6. In this manner, the circuit of FIG. 5 operates as a charge pump.

The diodes used in this circuit may be TFT elements which are diode connected, for example. Further, the capacitors 507 to 512 may be directly formed on the substrate or provided externally. The capacitor provided externally may have any form but it is preferable to use a chip capacitor in view of a circuit scale used for an RFID chip. Note that the example described with reference to FIG. 5 is only an example and a circuit configuration, the material and the number of the diodes and capacitors are not limited to these.

Further, this embodiment can be implemented in combination with any one of the structures of embodiment mode and Embodiment 1.

Embodiment 3

FIG. 6 is an example of a charge pump which is different from Embodiment 2.

The charge pump circuit shown here includes four transistors 601 to 604 and a capacitor 605 as shown in FIG. 6A. A gate electrode of the P-type transistor 601 is inputted with a signal A, a gate electrode of the N-type transistor 602 is inputted with a signal B, a gate electrode of the P-type transistor 603 is inputted with a signal C, and a gate electrode of the P-type transistor 604 is inputted with a signal D, respectively. By inputting the signals A to D as shown in FIG. 6B, an output signal higher than an input signal can be obtained.

A signal received by the antenna circuit 101 in FIG. 1 or a signal received by the antenna circuit 101 and amplified by the amplifier 104 to be inputted to the divider circuit 105, thereby divided can be used as the signals A to D.

An operation of the charge pump which is different from Embodiment 2 is described briefly with reference to FIG. 6. An operation period is divided into t1 to t4 according to an input pattern of the signals A to D. First, in the period t1, the signal A is Hi, the signal B is Lo, the signal C is Hi, and the signal D is Hi, which are inputted to the transistors 601 to 604 respectively. Therefore, the transistors 601 to 604 are OFF and the capacitor 605 and an output are in a floating state and do not change.

In the period t2, the signal A being Lo and the signal B being Hi turn ON the transistors 601 and 602. Accordingly, one end of the capacitor 605 is grounded while the other end thereof is charged according to a signal from an input terminal. The signals C and D remain Hi, therefore, the transistors 603 and 604 remain OFF.

In the period t3, the signal A becomes Hi and the signal B becomes Lo, therefore, the transistors 601 and 602 are turned OFF and a connection between the capacitor 605 and the input terminal is blocked. The signals C and D remain Hi in this period also, therefore, the transistors 603 and 604 remain OFF.

In the period t4, the signals A and B remain Hi and Lo respectively, therefore, the transistors 601 and 602 remain OFF. However, as the signals C and D become Lo, the transistors 603 and 604 are turned ON. Accordingly, one end of the capacitor 605 which is grounded rises to a potential of the input terminal, therefore, a potential of the capacitor 605 is risen by a capacitive coupling and outputted from an output terminal.

Then, the period t1 starts again in which the transistors 601 to 604 are turned OFF by the signals A to D. The aforementioned operation is repeated hereafter. In this manner, the circuit of FIG. 6 operates as a charge pump.

Further, the capacitor 605 may be directly formed on the substrate or provided externally. The capacitor provided externally may have any form but it is preferable to use a chip capacitor in view of circuit scale used for an RFID chip. Note that the example described with reference to FIG. 6 is only an example and a circuit configuration, the material and the number of the diodes and capacitors are not limited to these.

Further, this embodiment can be implemented in combination with any one of the structures of embodiment mode and Embodiment 1.

Embodiment 4

Figure 8:
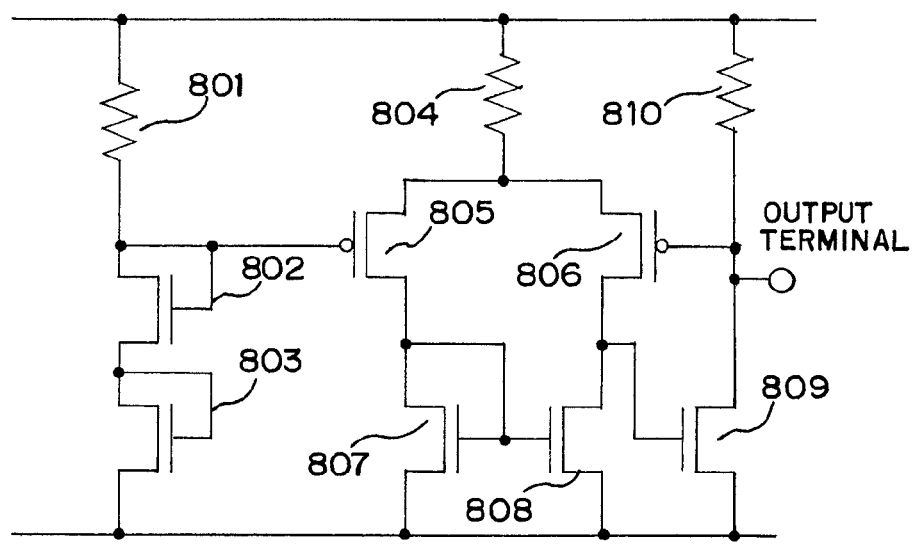
FIG. 8 is a diagram showing a circuit configuration of a stabilizing power source.

FIG. 8 is an example of the stabilizing power source. The stabilizing power source circuit of FIG. 8 is constituted by a reference voltage circuit and a buffer amplifier. The reference voltage circuit is formed of a resistor 801, diode-connected transistors 802 and 803, and generates a reference voltage which is equivalent to twice VGS of a transistor.

A buffer amplifier is formed of a differential circuit including transistors 805 and 806, a current mirror circuit including transistors 807 and 808, a common source amplifier including a resistor 804 for supplying current, a transistor 809, and a resistor 810.

When a current flowing from an output terminal is large, a current supplied to the transistor 809 is small, whereas when a current flowing from an output terminal is small, a current supplied to the transistor 809 is large. Thus, an operation is performed so that a current flowing to the resistor 810 is constant.

Further, a potential of the output terminal has almost the same value as the reference voltage circuit. Here, the stabilizing power source circuit is formed of the reference voltage circuit and the buffer amplifier, however, the invention is not limited to the aforementioned stabilizing power source circuit and it may be other circuits as well.

Further, this embodiment can be implemented in combination with any one of the structures of embodiment mode and Embodiments 1 to 3.

Embodiment 5

In this embodiment, a method for manufacturing a TFT (Thin Film Transistor) used for a switching transistor described in embodiment mode, a capacitor and the like on the same insulating substrate at the same time is described with reference to FIGS. 9 to 11. According to this method, a logic circuit portion (a logic circuit, a memory and the like) having N-type and P-type TFTs, a transmitting and receiving circuit (an amplifier, a divider circuit and the like) having N-type and P-type TFTs and a capacitor, and a power source circuit portion (a rectifier circuit, a stabilizing power source and the like) can be formed on the same substrate.

Note that an N-type TFT and a P-type TFT are described as examples of a semiconductor element in this embodiment, however, a semiconductor element included in an ID chip is not limited to this in the invention. An organic thin film transistor, a diode, an MIM element and the like may be appropriately used. Further, this manufacturing method is only an example and does not limit a manufacturing method on an insulating substrate. A MOS transistor using a single-crystalline substrate, a bipolar transistor, an inductor and the like can be appropriately used.

First, as shown in FIG. 9A, a base film 3001 is formed of an insulating film such as a silicon oxide film, a silicon nitride film, and a silicon oxynitride film on a substrate 3000. The substrate 3000 is formed of barium borosilicate glass typical example of which is Corning #7059 glass or Corning #1737 glass (product of Corning Incorporated), or of aluminoborosilicate glass, or a heat-resistant plastic. The base film 3000 is, for example, a lamination of a silicon oxynitride film 3001a that is formed by plasma CVD using $SiH_4$, $NH_3$, and $N_2O$ to have a thickness of 10 to 200 nm (preferably 50 to 100 nm) and a hydrogenated silicon oxynitride film 3001b formed by plasma CVD using $SiH_4$ and $N_2O$ to have a thickness of 50 to 200 nm (preferably 100 to 150 nm). In this embodiment, though the base film is formed to have a two-layer structure, the base film may have a single-layer or a laminated structure of two or more insulating films.

Island-shaped semiconductor layers 3002 to 3006 are formed of crystalline semiconductor films formed by crystallizing an amorphous semiconductor film by a laser crystallization method or a known thermal crystallization method. These island-shaped semiconductor layers 3002 to 3006 are 25 to 80 nm (more preferably 30 to 60 nm) in thickness. A material of a crystalline semiconductor film is not particularly limited, however, it is preferably formed of silicon or a silicon germanium (SiGe) alloy and the like.

For manufacturing a crystalline semiconductor film by a laser crystallization method, a pulse oscillation or a continuous oscillation excimer laser, a YAG laser, or a $YVO_4$ laser is used. In using such lasers, a laser light irradiated from the laser oscillator may be focused linearly by an optical system to be irradiated on the semiconductor film. A condition for crystallization is appropriately selected by a practitioner, however, a pulse oscillation frequency of 30 Hz and a laser energy density of 100 to 400 $mJ/cm^2$ (typically 200 to 300 $mJ/cm^2$) are selected when using an excimer laser. In using a YAG laser, a pulse oscillation frequency of 1 to 10 kHz and a laser energy density of 300 to 600 $mJ/cm^2$ (typically 350 to 500 $mJ/cm^2$) using the second high harmonic wave are selected. A laser light focused linearly in a width of 100 to 1000 μm, for example 400 μm is irradiated over an entire surface of a substrate. An overlapping rate of the linear laser light at this time is 80 to 98%.

Next, a gate insulating film 3007 which covers the island-shaped semiconductor layers 3002 to 3006 is formed. The gate insulating film 3007 is formed of an insulating film containing silicon in thickness of 40 to 150 nm by plasma CVD or sputtering. In this embodiment, a silicon oxynitride film in thickness of 20 nm is formed. It is needless to say that the gate insulating film is not limited to such a silicon oxynitride film, but a single layer or a laminated structure of other insulating films containing silicon may be employed as well. In the case of using a silicon oxide film, for example, TEOS (Tetraethyl Orthosilicate) and $O_2$ are mixed and discharged with a reaction pressure of 40 Pa, a substrate temperature of 300 to 400°C., an RF (13.56 MHz) power, a power density of 0.5 to 0.8 $W/cm^2$ by plasma CVD. A silicon oxide film formed in this manner can obtain good characteristics as a gate insulating film by subsequently applying thermal annealing at 400 to 500°C.

A first conductive film 3008 and a second conductive film 3009 for forming a gate electrode are formed on the gate insulating film 3007. In this embodiment, the first conductive film 3008 is formed of Ta in thickness of 50 to 100 nm and the second conductive film 3009 is formed of W in thickness of 100 to 300 nm.

A Ta film is formed by sputtering Ta as a target with Ar. In this case, by adding an optimum dose of Xe and Kr to Ar, an internal stress of the Ta film is alleviated and it can be prevented that a film peels off. Further, a a phase Ta film has a resistivity of about 20 .mu..OMEGA. cm which can be used for a gate electrode while a .beta. phase Ta film has a resistivity of about 180 mu..OMEGA. cm which is not suitable for being used for a gate electrode. In order to form a a phase Ta film, tantalum nitride having a crystalline structure that is close to the a phase of Ta may be formed as a base film of Ta in thickness of about 10 to 50 nm. Then, a a phase Ta film can be easily obtained.

A W film is formed by sputtering using W as a target. A thermal CVD method using tungsten hexafluoride (WF.sub.6) may be employed as well. In either case, a W film is required to have a low resistivity to be used as a gate electrode, which is preferably 20 mu..OMEGA. cm or less. The W film having large crystal grains can have a low resistivity, however, when a number of impurity elements such as oxygen exist in the W film, crystallization thereof is disturbed and the resistivity is increased. In consideration of this, in the case of employing sputtering, a W film is formed by using W as a target of which purity is 99.9999% and paying sufficient attention so that no impurity is mixed in from vapor phase in deposition. Accordingly, a W film having a resistivity of 9 to 20 mu..OMEGA. cm can be obtained.

Note that in this embodiment, the first conductive film 3008 is formed of Ta and the second conductive film 3009 is formed of W, however, the invention is not limited to this and an element selected from Ta, W, Ti, Mo, Al, Cu and the like or an alloy material or a compound material containing such element as a main component may be used as well. Further, a semiconductor film typified by a polycrystalline silicon film doped with impurity elements such as phosphorus may be used. Preferable combinations other than this embodiment are that the first conductive film is formed of tantalum nitride (TaN) and the second conductive film 3009 is formed of W, that the first conductive film 3008 is formed of tantalum nitride (TaN) and the second conductive film 3009 is formed of Al, that the first conductive film 3008 is formed of tantalum nitride (TaN) and the second conductive film 3009 is formed of Cu, and the like.

Further, in the case where LDD is allowed to be small, a structure such as a W single layer may be employed. Alternatively, by forming tapered angles, a length of LDD can be short even with the same structure.

Next, resist masks 3010 to 3015 are formed, thereby a first etching for forming electrodes and wirings is performed. In this embodiment, an ICP (Inductively Coupled Plasma) etching is performed with an etching gas mixed with CF.sub.4 and Cl.sub.2 to generate a plasma by applying an RF (13.56 MHz) power to a coiled electrode at a pressure of 1 Pa. By applying an RF (13.56 MHz) power of 100 W to a substrate side (sample stage), a negative self-bias voltage is substantially applied. In the case where CF.sub.4 and Cl.sub.2 are mixed as an etching gas, a W film and a Ta film are etched to the same extent.

By using an appropriate shape of resist masks under the aforementioned etching conditions, edge portions of the first conductive layer and the second conductive layer are tapered by an effect of a biased voltage applied to a substrate side. The angle of the tapered portion is 15 to 45.degree. In order to etch without leaving any residue on the gate insulating film, it is preferable to increase an etching time by 10 to 20.degree. As a selection ratio of a silicon oxynitride film to a W film is 2 to 4 (typically 3), an exposed portion of the silicon oxynitride film is etched by about 20 to 50 nm by overetching treatment. In this manner, conductive layers 3017 to 3022 having a first shape (lamination of first conductive layers 3017a to 3022a and second conductive layers 3017b to 3022b) formed of the first conductive layer and the second conductive layer are formed. At this time, a region which is not covered with the conductive films 3017 to 3022 having a first shape is etched by about 20 to 50 nm and a thinned region 3016 is formed (FIG. 9B).

Subsequently, a second etching is performed with resist masks 3010 to 3015 remaining. By using CF.sub.4, Cl.sub.2, and O-sub.2 as etching gases, the W film is selectively etched. At this time, conductive layers 3024 to 3029 having a second shape (first conductive layers 3024a to 3029a and second conductive layers 3024b to 3029b) are formed by the second etching treatment. At this time, a region which is not covered with the conductive films 3024 to 3029 having a second shape is etched by about 20 to 50 nm and a thinned region 3023 is formed.

An etching reaction of the W film or the Ta film by the mixture gas of CF.sub.4 and Cl.sub.2 can be guessed from a generated radical or ion species and the vapor pressure of a reaction product. When the vapor pressures of fluoride and chloride of W and Ta are compared with each other, the vapor pressure of WF.sub.6 as a fluoride of W is extremely high, and other WCl.sub.5, TaF.sub.5, and TaCl.sub.5 have almost equal vapor pressures. Thus, in the mixture gas of CF.sub.4 and Cl.sub.2, both the W film and the Ta film are etched. However, when a suitable amount of O.sub.2 is added to this mixture gas, CF.sub.4 and O.sub.2 react with each other to form CO and F, and a large amount of F radicals or F ions are generated. As a result, an etching rate of the W film having the high vapor pressure of fluoride is increased. On the other hand, as for Ta, even if F is increased, an increase of the etching rate is relatively small. Besides, since Ta is easily oxidized as compared to W, the surface of Ta is oxidized by adding O.sub.2. Since the oxide of Ta does not react with fluorine or chlorine, the etching rate of the Ta film is further decreased. Accordingly, it becomes possible to make a difference between the etching rates of the W film and the Ta film, and it becomes possible to make the etching rate of the W film higher than that of the Ta film.

Then, a first doping is performed to add an impurity element for imparting an N-type conductivity. Doping may be carried out by an ion doping method or an ion implanting method. The condition of the ion doping method is at a dosage of 1.times.10.sup.13 to 5.times.10.sup.14 atoms/cm.sup.2, and an acceleration voltage is 60 to 100 keV. As the impurity element for imparting the N-type conductivity, an element belonging to group 15, typically phosphorus (P) or arsenic (As) is used, and phosphorus is used here. In this case, the conductive layers 3024 to 3029 become masks to the impurity element for imparting the N-type conductivity, and first impurity regions 3030 to 3033 are formed in a self-aligning manner. The impurity element for imparting the N-type conductivity in the concentration range of 1.times.10.sup.20 to 1.times.10.sup.21 atoms/cm.sup.3 is added to the first impurity regions 3030 to 3033 (FIG. 9C).

As shown in FIG. 10A, a second doping is then performed after a portion to be a pixel TFT is covered with the resist masks 3034 and 3035. The resist mask does not cover an entire surface of the pixel TFT. In this case, an impurity element for imparting the N-type conductivity is doped in a smaller dose than in the first doping treatment and at a high acceleration voltage by reducing a dose lower than that in the first doping treatment. For example, the acceleration voltage is set at 70 to 120 keV, and the dose is set to $1 \times 10^{13}$ atoms/cm$^2$. Thus, new impurity regions 3036 to 3038 are formed in the first impurity regions 3030 to 3033 formed in the island-shaped semiconductor layer in FIG. 9C. In the doping, the second conductive layers 3024, 3026 and 3028 having the second shape are used as masks to the impurity element, and the doping is performed such that the impurity element is also added to regions under the first conductive layers 3024a, 3026a, and 3028a. Thus, third impurity regions 3039 to 3041 are formed. The third impurity regions 3039 to 3041 contain phosphorus (P) with a gentle concentration gradient according to the thickness gradient of the tapered portions of the first conductive layers 3018a, 3019a. In the semiconductor layers that overlap the tapered portions of the first conductive layers 30241, 3026a, and 3028a, the impurity concentration is slightly lower around the center than at the edges of the tapered portions of the first conductive layers 30241, 3026a, and 3028a. However, the difference is very slight and almost the same impurity concentration is kept throughout the semiconductor layers.

As shown in FIG. 110B, fourth impurity regions 3044 to 3046 each having an opposite conductivity type to the first conductivity layer are formed on the island-shaped semiconductor layers 3003 and 3005 which form P-type TFTs and the island-shaped semiconductor layer 3006 which forms a capacitor. By using the conductive layers 3025, 3027, and 3028 having a second shape as masks to the impurity elements, an impurity region is formed in a self-aligning manner. At this time, the island-shaped semiconductor layers 3002 and 3004 which form N-type TFTs are covered wholly with resist masks 3042 and 3043 respectively. Doping is performed by using the conductive films 3025, 3027, and 3028 having a second shape as masks, so that regions under the first conductive layers 3025a, 3027a, and 3028a that are not covered with the resist masks are added impurity elements. In this manner, fifth impurity regions 3047 to 3049 are formed. Although phosphorus is doped to the impurity regions 3044 to 3046 at a different concentration respectively, doping is performed by ion doping using diborane (B$_2$H$_6$) so that the concentration of the impurities for imparting P-type conductivity becomes $2 \times 10^{20}$/cm$^3$ to $2 \times 10^{21}$/cm$^3$ in any of these regions.

The impurity regions are formed in each island-shaped semiconductor layer through the aforementioned steps. The conductive layers 3024 to 3027 having a second shape overlapped with the island-shaped semiconductor layers function as gate electrodes. Moreover, the conductive layer 3029 having a second shape functions as an island-shaped source signal line while the conductive layer 3028 having a second shape functions as a capacitor wiring.

After removing the resist masks 3042 and 3043, a step for activating the impurity elements added to each island-shaped semiconductor layer is performed in order to control the conductivity. This step is performed by thermal annealing using an annealing furnace. Besides, laser annealing or rapid thermal annealing (RTA) can be applied as well. The thermal annealing is performed in the nitrogen atmosphere with an oxygen concentration of 1 ppm or less, more preferably of 0.1 ppm or less, at a temperature of 400 to 700.degree. C. and typically 500 to 600.degree. C. In this embodiment, thermal treatment is performed at 500.degree. C. for four hours. However, in the case where wiring materials used for the conductive layers 3024 to 3029 having a second shape are sensitive to heat, an activation is preferably performed after forming an interlayer insulating film 3050 (containing silicon as a main component) in order to protect wiring and the like.

Thermal treatment is further provided in an atmosphere containing 3 to 100% of hydrogen at 300 to 450.degree. C. for 1 to 12 hours in order to hydrogenate the island-shaped semiconductor layers. This step is provided in order to saturate dangling bonds in the semiconductor layers by thermally excited hydrogen. As another method of hydrogenation, plasma hydrogenation (using hydrogen excited by plasma) may be provided as well (FIG. 10C).

Next, the first interlayer insulating film 3050 is formed of a silicon oxynitride film in thickness of 100 to 200 nm. Then, a second interlayer insulating film 3051 formed of an organic insulating material such as acryl is formed thereon. Further, an inorganic material can be used instead of an organic insulating material as the second interlayer insulating film 3051. Inorganic SiO$_2$, (PCVD-SiO$_2$) formed by plasma CVD, SOG (Spin On Glass; coating a silicon oxide film) and the like are used for an inorganic material. An etching step is provided in order to form contact holes after forming the two interlayer insulating films.

Then, source wirings 3052 and 3053 for forming a contact with a source region of the island-shaped semiconductor layers and a drain wiring 3056 for forming a contact with a drain region are formed in a logic circuit portion. Further, source electrodes 3054 and 3055, a drain electrode 3057, and a connecting electrode 3058 are formed in an input-output circuit portion and a power source circuit portion as well (FIG. 11).

As described above, a logic circuit portion having an N-type TFT and a P-type TFT, an input-output circuit portion and a power source circuit portion having an N-type TFT, a P-type TFT, and a capacitor can be formed on the same substrate.

Further, this embodiment can be implemented in combination with any one of the structures of embodiment mode and Embodiments 1 to 4.

Embodiment 6

In this embodiment, a method for forming an ID chip and transferring it to a flexible substrate is described with reference to FIGS. 12A to 13B. Note that an N-type TFT and a P-type TFT are described as examples of a semiconductor element in this embodiment, however, a semiconductor element included in an ID chip is not limited to this in the invention. Moreover, this manufacturing method is only an example and does not limit a manufacturing method on an insulating substrate.

A metal oxide film 4000 is formed on an insulating substrate 3000. For the metal oxide film, tungsten oxide can be used, for example.

According to the manufacturing steps described in Embodiment 5, up to the steps for forming the first and the second interlayer insulating films are performed as shown in FIG. 11.

Figure 12A:
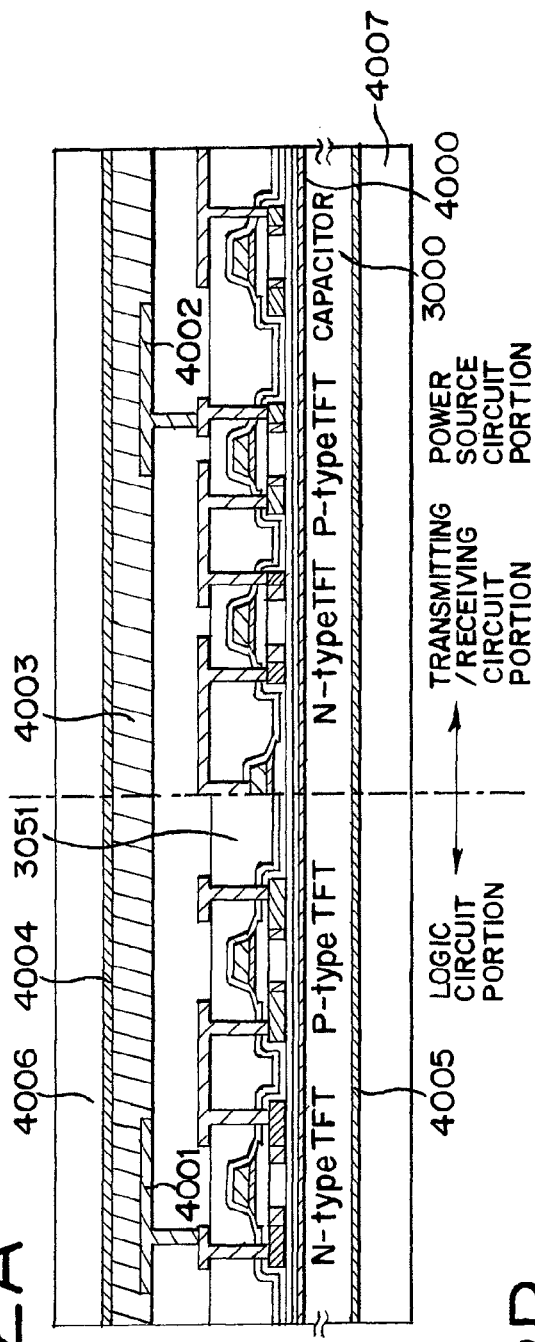
FIGS. 12A and 12B are diagrams showing a manufacturing process of the semiconductor device of the invention.

Next, pads 4001 and 4002 are formed and a protective layer 4003 is formed on the second interlayer insulating film 3051 and pads 4001 and 4002. Next, a second substrate 4006 is adhered on the protective layer 4003 using a double-faced tape 4004 and a third substrate 4007 is attached on the substrate 3000 using a double-faced tale 4005 (FIG. 12A). The third substrate 4007 prevents the substrate 3000 from being damaged in a subsequent peeling step.

Figure 12B:
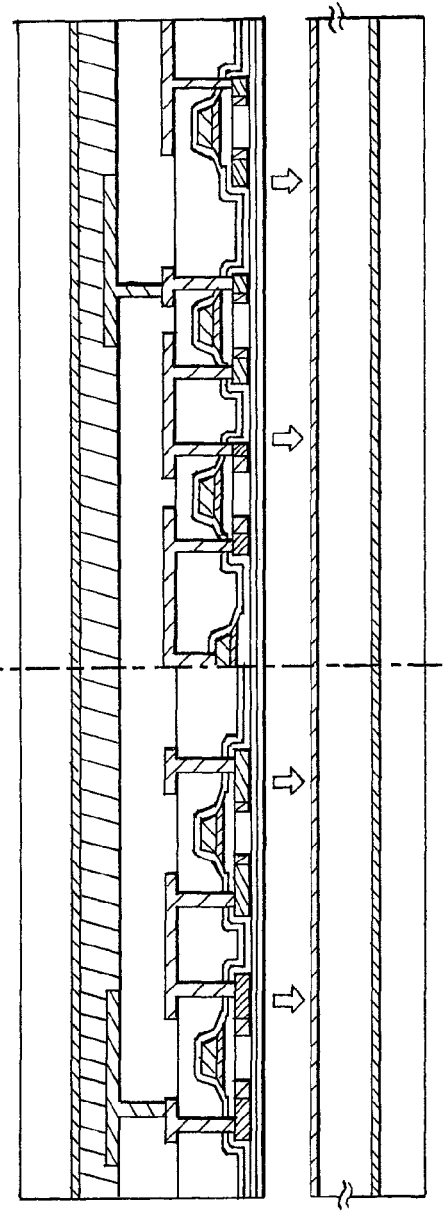

Then, the metal oxide film 4000 and the substrate 3000 are peeled off physically. FIG. 12B shows a state after peeling.

After that, a flexible substrate 4009 and the base film 3001 are adhered with an adhesive 4008 (FIG. 13A).

Next, the double-faced tape 4004 and the second substrate 4006 are peeled off the protective layer 4003 to remove the protective layer 4003 as shown in FIG. 13B, thus a transfer to the flexible substrate can be performed.

Further, in this embodiment, a semiconductor device formed by using the second substrate having an antenna is described with reference to FIGS. 20A and 20B.

Figure 20A:
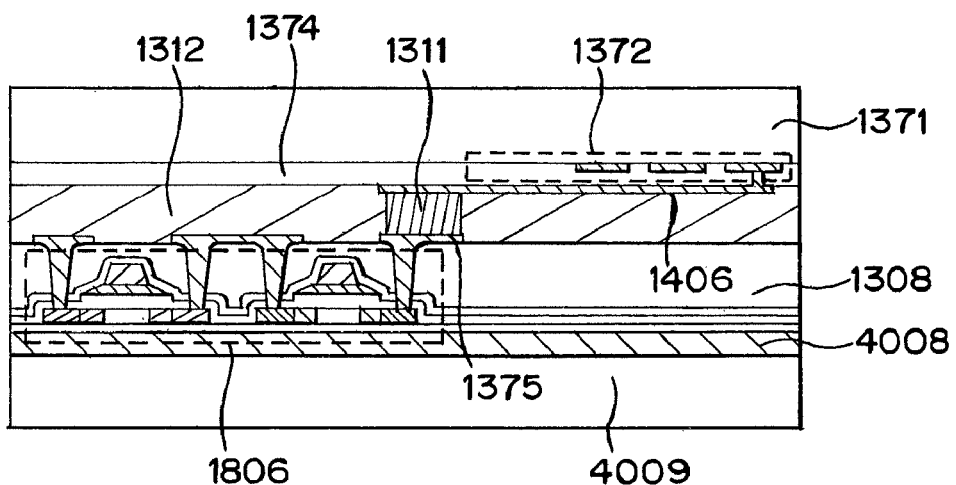
FIGS. 20A and 20B are diagrams showing the semiconductor device of the invention.

FIG. 20A is a sectional view showing a connecting portion between a portion of a transmitting and receiving circuit or a power source circuit and an antenna. A TFT 1806 is provided on a first flexible substrate 4009 with the adhesive 4008. On the other hand, an antenna 1372 and a pad 1406 are formed on a second flexible substrate 1371, sandwiching an insulating film 1374. A source electrode or a drain electrode 1375 of the TFT 1806 is connected to the pad 1406 through a conductive layer 1311. Further, the first flexible substrate 1818 and the second flexible substrate 1371 are adhered with an adhesive 1312 with the antenna 1372 and the TFT 1806 facing each other.

Figure 20B:
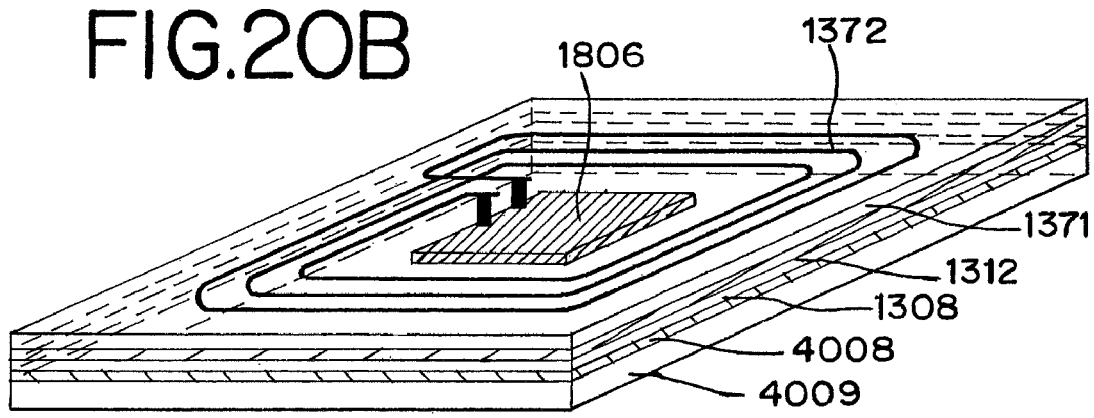

FIG. 20B is a perspective view of a semiconductor device of FIG. 20A. A semiconductor integrated circuit and the antenna 1372 electrically connected to it are provided between the first flexible substrate 4009 and the second flexible substrate 1371.

Further, this embodiment can be implemented in combination with any one of the structures of embodiment mode and Embodiments 1 to 5.

Embodiment 7

Instead of the peeling step of Embodiment 6, an amorphous silicon film containing hydrogen is provided between a substrate having a high heat resistance and TFTs and the substrate and the TFTs are peeled off by removing the amorphous silicon film by laser irradiation or etching, then the TFTs can be adhered to a flexible substrate. Moreover, the TFTs can be peeled off the substrate by removing the substrate having a high heat resistance on which the TFTs are formed by etching with solution or gas, or mechanically.

In order to peel the TFTs off the substrate having a high heat resistance on which the TFTs are formed by etching with solution or gas, the TFTs and an insulating film for protecting the TFTs are formed after laminating a peeling layer of silicon film and an insulating film on the substrate. Then, the substrate is exposed to gas or liquid containing halogen fluoride to remove the peeling layer.

In this case, a metal plate such as a stainless plate or a semiconductor substrate on which an insulating film such as silicon oxide, and silicon nitride is formed can be used. For example, a silicon oxide film formed by covering a Si wafer may be used as a substrate as well.

Otherwise, a silicon oxide film and the like formed on a Si wafer may be used as a substrate as well. In this case, the Si wafer is etched by halogen fluoride such as ClF.sub.3 (Chlorotrifluoride) and removed. Single crystalline silicon is formed on the silicon oxide film, thus a transistor having single crystalline silicon can be formed.

In this manner, in the case of using a Si wafer, a finer semiconductor integrated circuit can be formed as compared to the case of forming a semiconductor integrated circuit on other substrates.

Embodiment 8

In this embodiment, an example in which an external antenna is provided to a circuit using the invention is described with reference to FIGS. 14A to 14E, 15, 18A to 18D, 19A and 193.

Figure 14A:
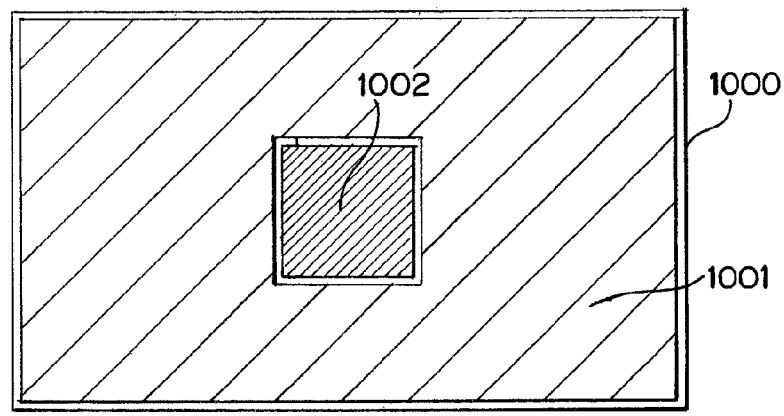
FIGS. 14A to 14E are diagrams showing examples of antennas using the semiconductor device of the invention.

FIG. 14A shows the case where a circuit is surrounded by a sheet of antenna. An antenna 1001 is formed on a substrate 1000 and a circuit 1002 using the invention is connected thereto. In FIG. 14A, the circuit 1002 is surrounded by the antenna 1001, however, the antenna 1001 may cover the whole surface and the circuit 1002 with electrodes may be adhered thereon.

Figure 18A:
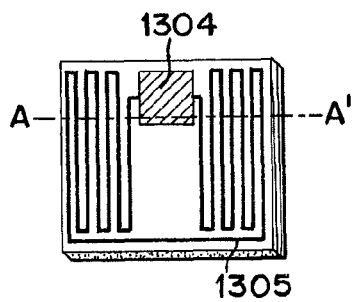
FIGS. 18A to 18D are diagrams showing the semiconductor device of the invention.
Figure 18B:
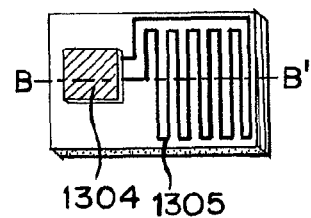
Figure 18C:
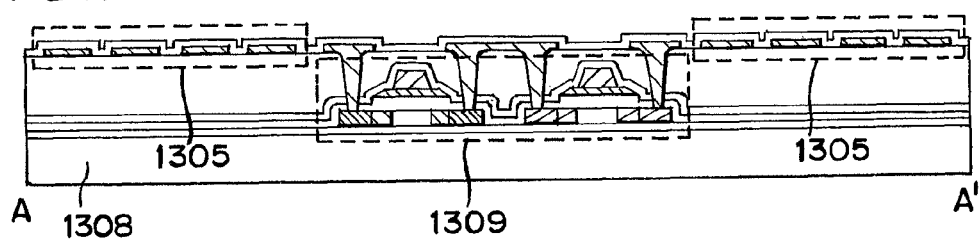

FIGS. 18A and 18C even shows a semiconductor device in which a semiconductor integrated circuit 1304 and an antenna 1305 are formed on the same substrate. FIG. 18A is a top plan view and FIG. 18C is a sectional view of FIG. 18A along A-A'. The antenna 1305 is formed at the same time as a source electrode and a drain electrode of a TFT 1309 which forms the semiconductor integrated circuit 1304.

Figure 18D:
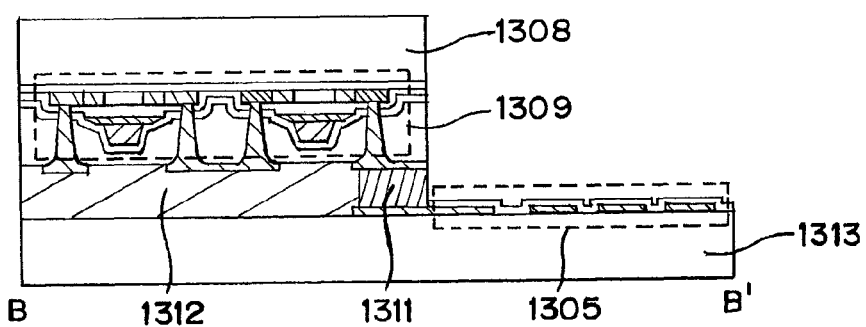

FIGS. 18B and 18D each shows a semiconductor device having the semiconductor integrated circuit 1304 on a substrate 1313 including the antenna 1305. FIG. 18B is a top plan view and FIG. 18D is a sectional view of FIG. 18B along B-B'. A TFT 1309 forming the semiconductor integrated circuit 1304 and the antenna 1305 are electrically connected to each other through a conductive layer 1331.

Figure 14B:
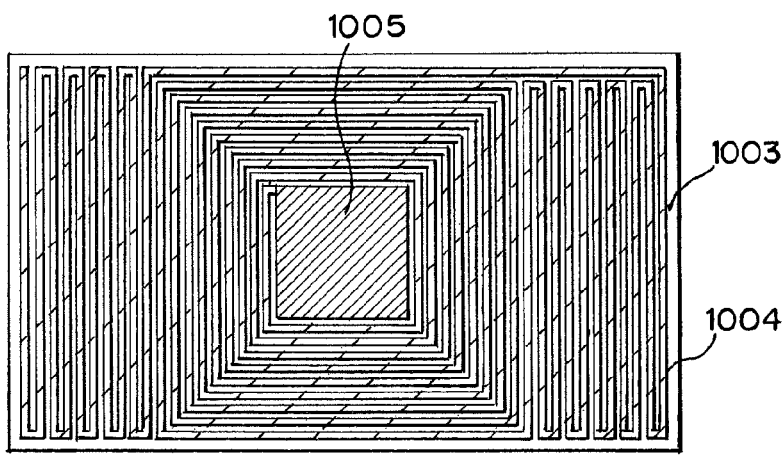

FIG. 14B shows the case where a thin antenna is provided so as to surround a circuit. An antenna 1004 is formed on a substrate 1003 and a circuit 1005 using the invention is connected thereto. Note that a wiring of the antenna here is only an example and the invention is not limited to this.

Figure 14C:
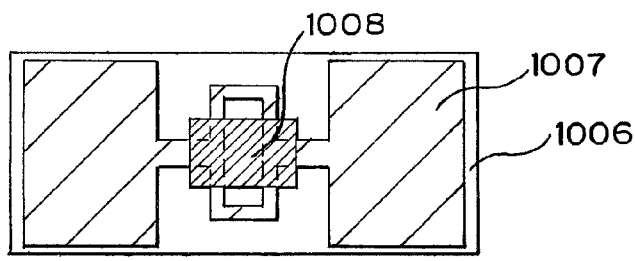

FIG. 14C shows the case where an antenna for high frequency signals is provided. An antenna 1007 is formed on a substrate 1006 and a circuit 1008 using the invention is connected thereto.

Figure 14D:
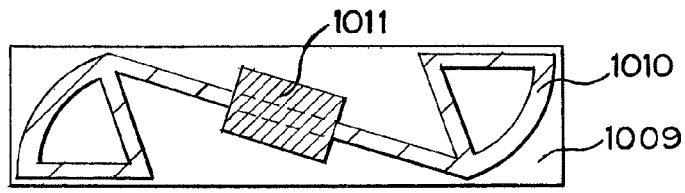

FIG. 14D shows the case where an antenna is an omnidirectional (capable of receiving radio waves from any direction) within 180.degree. An antenna 1010 is formed on the substrate 1009 to which a circuit 1011 using the invention is connected.

Figure 14E:
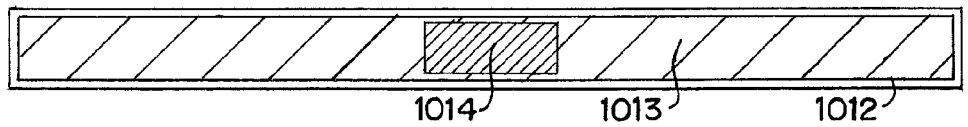

FIG. 14E shows the case where an antenna is in a shape of a long bar. An antenna 1013 is formed on a substrate 1012 and a circuit 1014 using the invention is connected thereto.

The circuit using the invention and these antennas can be connected by a known method. For example, the antenna and the circuit may be connected by wire bonding or bump bonding. Alternatively, a surface of the circuit formed as a chip may be used as an electrode to be adhered to the antenna. In this method, the circuit can be adhered to the antenna by using an ACF (anisotropic conductive film).

An appropriate length of the antenna is different depending on the frequency used for reception. It is generally preferable that the antenna is as long as an integer fraction of the frequency. For example, in the case where the frequency is 2.45 GHz, the antenna is preferably about 60 mm (½ wavelength) and about 30 mm (¼ wavelength).

Figure 15A:
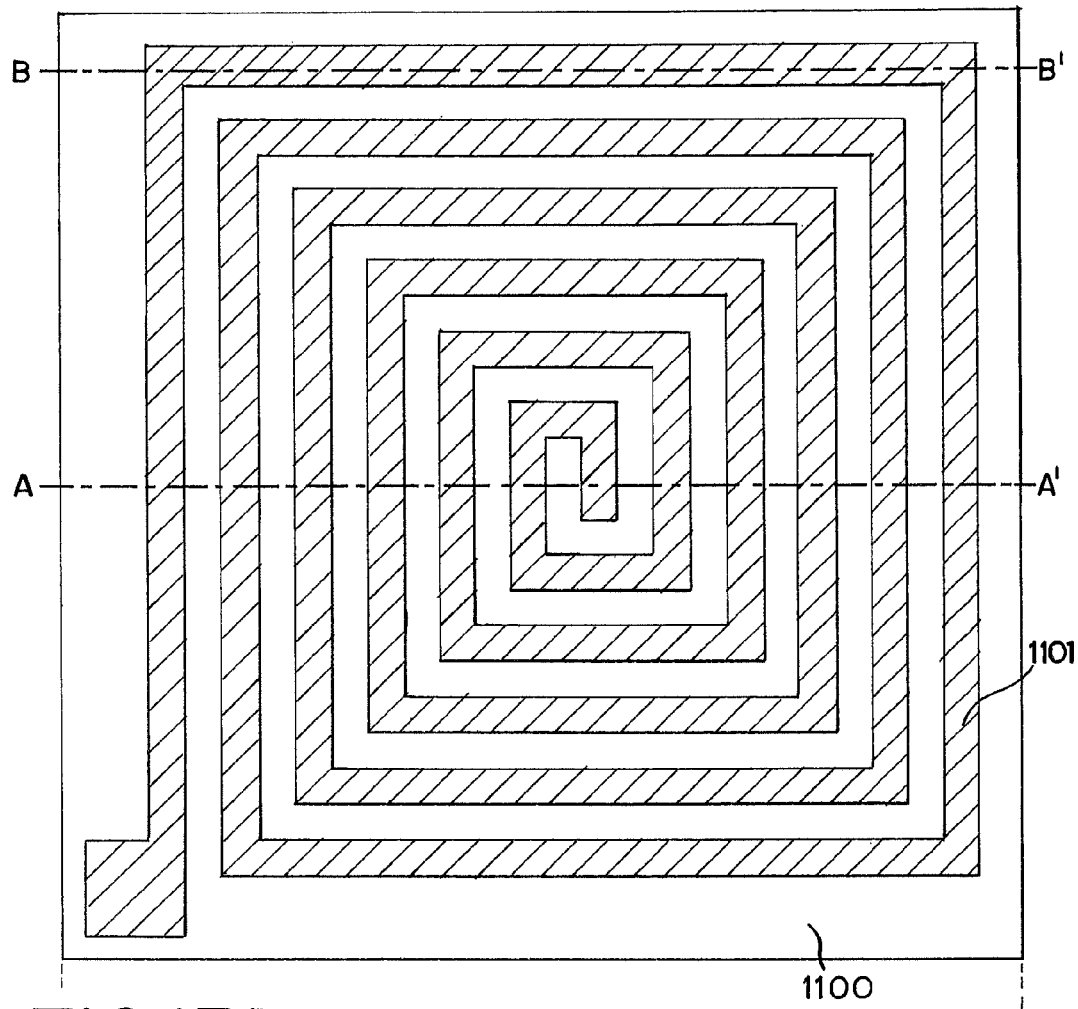
FIGS. 15A to 15C are diagrams showing examples of an antenna using the semiconductor device of the invention.
Figure 15B:
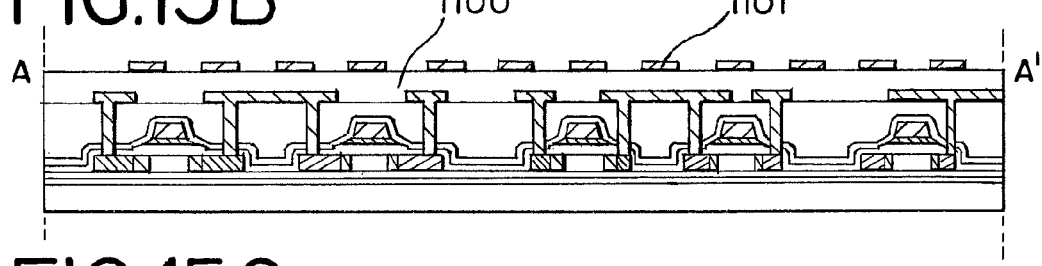
Figure 15C:
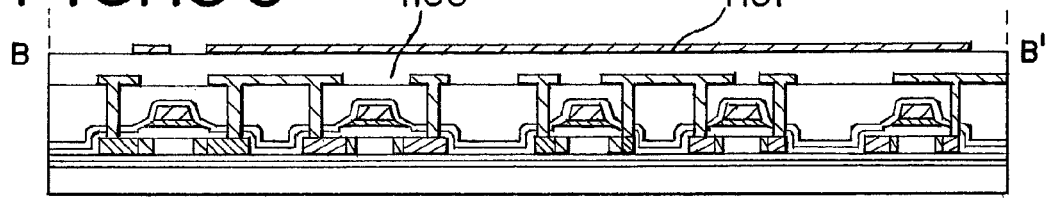

Moreover, another substrate (top substrate) having the circuit of the invention is attached to the substrate and an antenna may be formed thereon. FIGS. 15A to 15C show a top plan view and sectional views of a circuit on which a substrate is attached and a spiral antenna is provided thereon. FIG. 15A is a top plan view of a semiconductor device provided with an antenna, FIG. 15B is a sectional view of FIG. 15S along (A)-(A'), and FIG. 15C is a sectional view of FIG. 15A along (B)-(B'). The circuit of the invention is formed on a substrate 1102, a top substrate 1100 is provided on the circuit, and an antenna 1101 is formed on the top substrate.

Figure 19A:
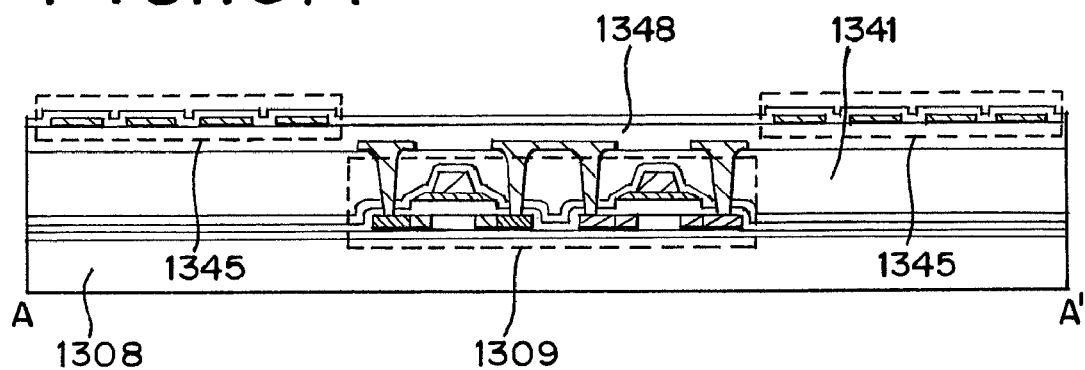
FIGS. 19A and 19B are diagrams showing the semiconductor device of the invention.

Moreover, as shown in FIG. 19A, a second interlayer insulating film 1348 is formed on an interlayer insulating film 1341 on which a TFT 1309 is formed, and an antenna 1345 may be formed on the second interlayer insulating film 1348.

In this case, an antenna can be formed on the TFT 1309 also, therefore, an antenna of an arbitrary length can be formed.

Figure 19B:
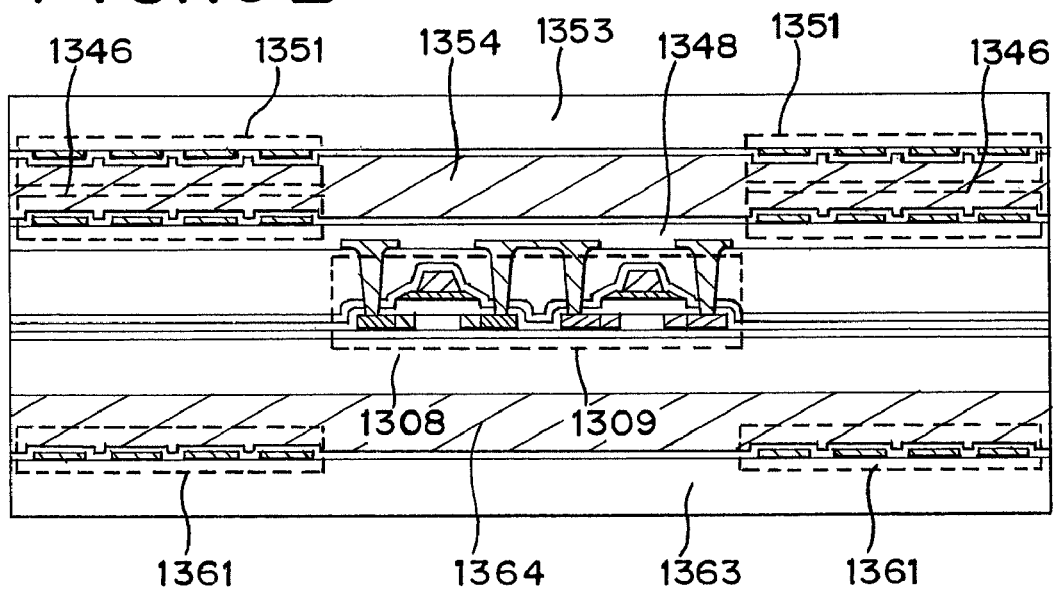

Further, as shown in FIG. 19B, a semiconductor integrated circuit having an antenna can be sandwiched by substrates on which antennas are formed. A substrate 1308 on which a TFT 1309 is formed and a substrate (a second substrate) 1363 on which an antenna 1361 is formed are adhered with a first adhesive 1364. Moreover, an antenna 1346 formed on the TFT 1309 sandwiching the second interlayer insulating film 1348 and a substrate (third substrate) 1353 on which an antenna 1351 is formed are adhered with a second adhesive 1354.

Note that the substrate having the TFT 1309 and the antenna 1346 is sandwiched by the second substrate 1363 and the third substrate 1353 in FIG. 19B, however, the invention is not limited to this structure. For example, the second substrate may be folded to sandwich the substrate having the TFT 1309 and the antenna 1346. Moreover, the TFT 1309 without the antenna 1346 may be sandwiched by one or a plurality of substrates.

In these cases, an antenna can be formed longer than the semiconductor device in FIG. 19A.

Note that this embodiment shows only an example and does not limit the shape of the antenna. The invention can be implemented with any form of antenna.

Further, this embodiment can be implemented in combination with any one of the structures of embodiment mode and Embodiments 1 to 6.

Embodiment 9

In this embodiment, examples of an IC card, an ID tag, an ID chip and the like using the invention are described with reference to FIGS. 16A to 16H and 17.

Figure 16A:
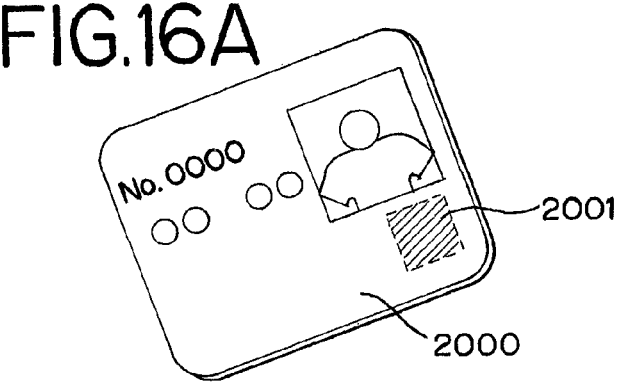
FIGS. 16A to 16H are views showing application examples using the semiconductor device of the invention.

FIG. 16A illustrates an IC card which can be used for an identification of an individual and as a credit card or electronic money by which payment can be made without using cash by utilizing a rewritable memory in an incorporated circuit. A circuit 2001 using the invention is incorporated in an IC card 2000.

Figure 16B:
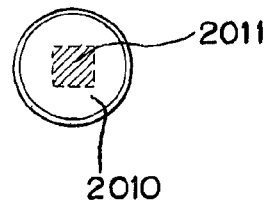

FIG. 16B illustrates an ID tag which can be used for an identification of an individual and for management of entrance at a specific place by virtue of its compactness. A circuit 2011 using the invention is incorporated in an ID tag 2010.

Figure 16C:
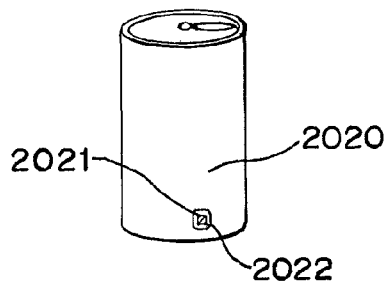

FIG. 16C illustrates an ID chip 2022 adhered on a merchandise for merchandise management at a retail store such as a supermarket. The invention is applied to a circuit in the ID chip 2022. By using an ID chip in this manner, not only the inventory management is simplified, but shoplifting and the like can be prevented as well. In FIG. 16C, a protective film 2021 is provided for adhesion so that the ID chip 2022 is not peeled off however, the ID chip 2022 may be directly adhered by using an adhesive. Moreover, it is preferable that a flexible substrate as described in Embodiment Mode 2 is used for fabricating the ID chip 2022 in view of adhering on a merchandise.

Figure 16D:
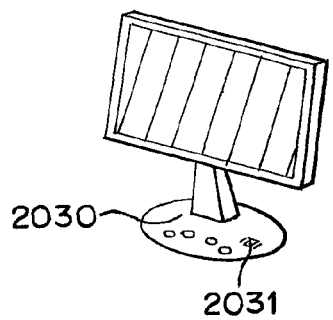

FIG. 16D illustrates an example that an ID chip for identification is incorporated in a merchandise when manufactured. In FIG. 16D, an ID chip 2031 is incorporated in a housing 2030 of a display as an example. The invention is applied to a circuit in the ID chip 2031. With such a structure, a manufacturer, a distribution management of the merchandises and the like can be easily conducted. Note that a housing of a display is taken as an example in FIG. 16D, however, the invention is not limited to this and can be applied to various objects.

Figure 16E:
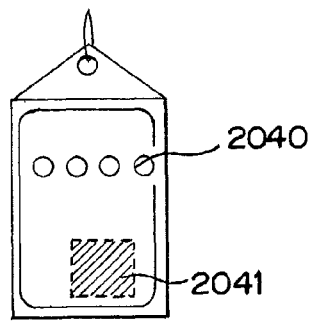

FIG. 16E illustrates a shipping tag for transporting objects. In FIG. 16E, an ID chip 2041 is incorporated in a shipping tag 2040. The invention is applied to a circuit in the ID chip 2041. With such a structure, a selection of destination and a distribution management of merchandises can be conducted easily. Note that the shipping tag is fastened to a string for tying up an object in FIG. 16E, however, the invention is not limited to this and the tag may be directly adhered on an object by using a sealing material and the like.

Figure 16F:
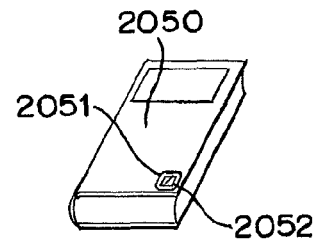

FIG. 16F illustrates an ID chip 2052 incorporated in a book 2050. The invention is applied to a circuit in the ID chip 2052. With such a structure, a distribution management at a bookstore or circulation management at a library and the like can be conducted easily. In FIG. 16F, a protective film 2051 is used for adhesion so that the ID chip 2052 is not peeled off, however, the ID chip 2052 may be directly adhered by using an adhesive or incorporated in a book cover of the book 2050.

Figure 16G:
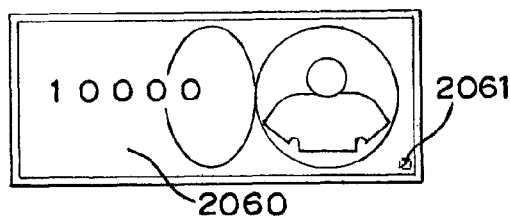

FIG. 16G illustrates an RFID chip 2061 incorporated in a paper money 2060. The invention is applied to a circuit in the ID chip 2061. With such a structure, a circulation of counterfeit paper money can be prevented easily. Note that the ID chip 2061 is preferably embedded in the paper money 2060 to prevent the ID chip 2061 from peeling off due to the nature of paper money.

Figure 16H:
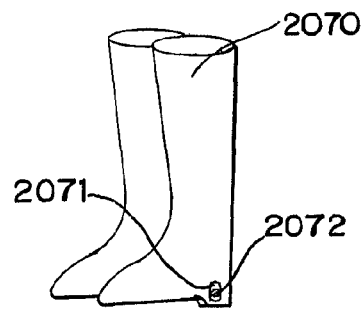

FIG. 16H illustrates an ID chip 2072 incorporated in a shoe 2070. The invention is applied to a circuit in the RFID chip 2072. With such a structure, an identification of manufacturer, a distribution management of merchandises and the like can be conducted easily. In FIG. 16H, a protective film 2071 is provided for adhesion so that the ID chip 2072 is not peeled off, however, the ID chip 2022 may be directly adhered by using an adhesive or incorporated in the shoe 2070.

Figure 17:
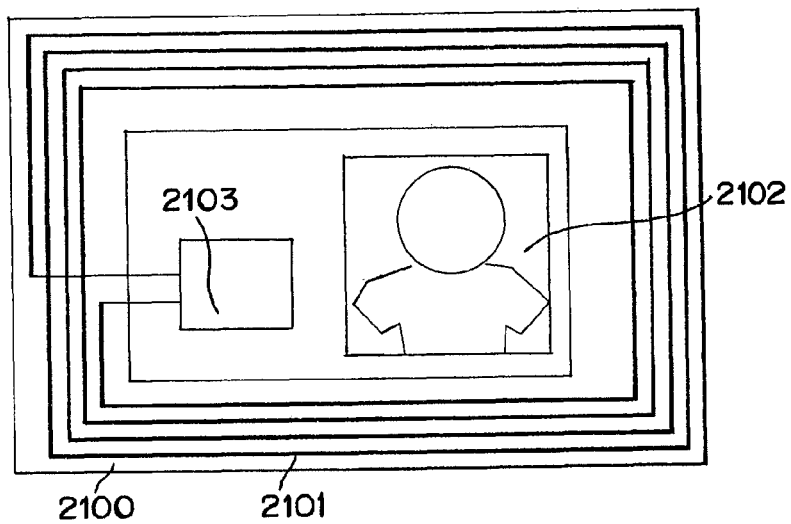
FIG. 17 is a diagram showing an example of an IC card with a display device using the semiconductor device of the invention.

FIG. 17 illustrates an IC card having a display portion 2102 and the circuit of the invention around which is provided with an antenna 2101 in a circle. The display portion 2102 is provided with a driver circuit and the like required for display and can display and rewrite an image by utilizing a memory in a circuit or a signal inputted from outside the display portion. A circuit 2103 using the invention is incorporated in an IC card 2100. The antenna 2101 is disposed in the periphery along the shape of the IC card 2100, however, this does not limit the shape of the antenna. The shape of the antenna can be freely determined. Furthermore, the antenna is not limited to be provided externally, but may be incorporated in the circuit as well.

Note that the examples described in this embodiment are only examples and the invention is not limited to these applications.

As described above, an application range of the invention is quite wide and the invention can be applied to a chip for identification of various objects. Further, this embodiment can be implemented in combination with any one of the structures of embodiment mode and Embodiments 1 to 7.

This application is based on Japanese Patent Application serial no. 2003-423861 filed in Japan Patent Office on Dec. 19>2003, the contents of which are hereby incorporated by reference.

What is claimed is:

1. An RFID comprising:
    an antenna circuit;
    a power source circuit configured to form a stabilized voltage from a first alternating signal outputted from the antenna circuit; and
    a charge pump circuit configured to be supplied with the stabilized voltage, and to use a second alternating signal which does not pass through the power source circuit as a clock signal.

2. The RFID according to claim 1, further comprising:
a display portion configured to use a power source voltage formed by the charge pump circuit.

3. The RFID according to claim 1, further comprising:
a non-volatile memory configured to use a first power source voltage formed by the charge pump circuit when writing a data, and to use a second power source voltage formed by the power source circuit when reading the data.

4. The RFID according to claim 1, further comprising:
a first substrate; and
a second substrate,
wherein the power source circuit comprises a first thin film transistor formed over the first substrate,
wherein the charge pump circuit comprises a second thin film transistor formed over the first substrate, and
wherein the antenna circuit is formed over the second substrate.

5. An RFID comprising:
an antenna circuit;
a power source circuit configured to form a stabilized voltage from a first alternating signal outputted from the antenna circuit;
a divider circuit configured to be supplied the stabilized voltage, to be inputted a second alternating signal which does not pass through the power source circuit, and to form a divided alternating signal from the second alternating signal which does not pass through the power source circuit; and
a charge pump circuit configured to be supplied the stabilized voltage, and to use the divided alternating signal as a clock signal.

6. The RFID according to claim 5, further comprising:
a display portion configured to use a power source voltage formed by the charge pump circuit.

7. The RFID according to claim 5, further comprising:
a non-volatile memory configured to use a first power source voltage formed by the charge pump circuit when writing a data, and to use a second power source voltage formed by the power source circuit when reading the data.

8. The RFID according to claim 5, further comprising:
a first substrate; and
a second substrate,
wherein the power source circuit comprises a first thin film transistor formed over the first substrate,
wherein the charge pump circuit comprises a second thin film transistor formed over the first substrate, and
wherein the antenna circuit is formed over the second substrate.

9. An RFID comprising:
an antenna circuit;
a power source circuit configured to form a stabilized voltage from a first alternating signal outputted from the antenna circuit;
a divider circuit configured to be supplied the stabilized voltage, to be inputted a second alternating signal, which does not pass through the power source circuit, through an amplifier, and to form a divided alternating signal from the second alternating signal which does not pass through the power source circuit; and
a charge pump circuit configured to be supplied the stabilized voltage, and to use the divided alternating signal as a clock signal.

10. The RFID according to claim 9, further comprising:
a display portion configured to use a power source voltage formed by the charge pump circuit.

11. The RFID according to claim 9, further comprising:
a non-volatile memory configured to use a first power source voltage formed by the charge pump circuit when writing a data, and to use a second power source voltage formed by the power source circuit when reading the data.

12. The RFID according to claim 9, further comprising:
a first substrate; and
a second substrate,
wherein the power source circuit comprises a first thin film transistor formed over the first substrate,
wherein the charge pump circuit comprises a second thin film transistor formed over the first substrate, and
wherein the antenna circuit is formed over the second substrate.

13. An RFID comprising:
an antenna circuit;
a power source circuit configured to form a stabilized voltage from an alternating signal outputted from the antenna circuit, the power source circuit comprising:
a rectifier circuit configured to form a half-rectified alternating signal from the alternating signal outputted from the antenna circuit; and
a stabilizing power source circuit configured to form the stabilized voltage from the half-rectified alternating signal;
a divider circuit configured to be supplied the stabilized voltage, to be inputted the alternating signal, which does not pass through the power source circuit, through an amplifier, and to form a divided alternating signal from the alternating signal which does not pass through the power source circuit; and
a charge pump circuit configured to be supplied the stabilized voltage, and to use the divided alternating signal as a clock signal.

14. The RFID according to claim 13, further comprising:
a display portion configured to use a power source voltage formed by the charge pump circuit.

15. The RFID according to claim 13, further comprising:
a non-volatile memory configured to use a first power source voltage formed by the charge pump circuit when writing a data, and to use a second power source voltage formed by the power source circuit when reading the data.

16. The RFID according to claim 13, further comprising:
a first substrate; and
a second substrate,
wherein the power source circuit comprises a first thin film transistor formed over the first substrate,
wherein the charge pump circuit comprises a second thin film transistor formed over the first substrate, and
wherein the antenna circuit is formed over the second substrate.

* * * * *

UNITED STATES PATENT AND TRADEMARK OFFICE
CERTIFICATE OF CORRECTION

| | |
|---|---|
| PATENT NO. | : 7,942,338 B2 |
| APPLICATION NO. | : 12/369212 |
| DATED | : May 17, 2011 |
| INVENTOR(S) | : Jun Koyama and Toshihiko Saito |

It is certified that error appears in the above-identified patent and that said Letters Patent is hereby corrected as shown below:

In the Specification:

Column 7, Line 57-58, Change "VIN-VF).times.6" to --VIN-VF) x 6--.

Column 8, Line 12-13, Change "VIN-VF).times.6" to --VIN-VF) x 6--.

Column 10, Line 15, Change "SiH.sub.4," to --$SiH_4$,--.

Column 10, Line 15, Change "NH.sub.3," to --$NH_3$,--.

Column 10, Line 16, Change "N.sub.2O" to --$N_2O$--.

Column 10, Line 18, Change "SiH.sub.4" to --$SiH_4$--.

Column 10, Line 18, Change "N.sub.2O" to --$N_2O$--.

Column 10, Line 34, Change "YVO.sub.4" to --$YVO_4$--.

Column 10, Line 40, Change "mJ/cm.sup.2" to --$mJ/cm^2$--.

Column 10, Line 41, Change "mJ/cm.sup.2)" to --$mJ/cm^2$)--.

Column 10, Line 43-44, Change "mJ/cm.sup.2" to --$mJ/cm^2$--.

Column 10, Line 44, Change "mJ/cm.sup.2)" to --$mJ/cm^2$)--.

Column 10, Line 46, Change "1000.mu.rn" to --1000μm--.

Column 10, Line 46, Change "400.mu.m" to --400μm--.

Column 10, Line 59, Change "O.sub.2" to --$O_2$--.

Column 10, Line 61, Change "400.degree.C" to --400°C--.

Signed and Sealed this
Tenth Day of January, 2012

David J. Kappos
*Director of the United States Patent and Trademark Office*

CERTIFICATE OF CORRECTION (continued)
U.S. Pat. No. 7,942,338 B2

Column 10, Line 62, Change "W/cm.sup.2" to --W/cm$^2$--.

Column 10, Line 65, Change "500.degree.C." to --500°C--.

Column 11, Line 8, Change "a a" to --a α--.

Column 11, Line 9, Change "20mu..OMEGA. cm" to --20μΩ cm--.

Column 11, Line 10, Change "a .beta. phase" to --a β phase--.

Column 11, Line 11, Change "20mu..OMEGA. cm" to --20μΩ cm--.

Column 11, Line 12, Change "a a" to --a α--.

Column 11, Line 14, Change "the a phase" to --the α phase--.

Column 11, Line 15, Change "a a" to --a α--.

Column 11, Line 18-19, Change "(WF.sub.6)" to --(WF$_6$)--.

Column 11, Line 21, Change "20 mu..OMEGA. cm" to --20 μΩ cm--.

Column 11, Line 30, Change "20 mu..OMEGA. m" to --20 μΩ cm--.

Column 11, Line 54, Change "CF.sub.4" to --CF$_4$--.

Column 11, Line 55, Change "Cl.sub.2" to --Cl$_2$--.

Column 11, Line 59, Change "CF.sub.4" to --CF$_4$--.

Column 11, Line 59, Change "Cl.sub.2" to --Cl$_2$--.

Column 11, Line 66, Change "45.degree." to --45°--.

Column 12, Line 1, Change "20.degree" to --20°--.

Column 12, Line 14, Change "CF.sub.4," to --CF$_4$,--.

Column 12, Line 14, Change "Cl.sub.2," to --Cl$_2$,--.

Column 12, Line 15, Change "O-sub.2" to --O$_2$--.

Column 12, Line 24, Change "CF.sub.4" to --CF$_4$--.

Column 12, Line 24, Change "Cl.sub.2" to --Cl$_2$--.

Column 12, Line 28, Change "WF.sub.6" to --WF$_6$--.

Column 12, Line 29, Change "WCl.sub.5," to --WCl$_5$,--.

Column 12, Line 29, Change "TaF.sub.5," to --TaF$_5$,--.

CERTIFICATE OF CORRECTION (continued)

Column 12, Line 29, Change "TaCl.sub.5" to --TaCl$_5$--.

Column 12, Line 30, Change "CF.sub.4" to --CF$_4$--.

Column 12, Line 31, Change "Cl.sub.2," to --Cl$_2$,--.

Column 12, Line 32, Change "O.sub.2" to --O$_2$--.

Column 12, Line 33, Change "CF.sub.4" to --CF$_4$--.

Column 12, Line 33, Change "O.sub.2" to --O$_2$--.

Column 12, Line 39, Change "O.sub.2" to --O$_2$--.

Column 12, Line 50, Change "1.times.10.sup.13" to --1x10$^{13}$--.

Column 12, Line 50, Change "5.times.10.sup.14" to -- 5x10$^{14}$--.

Column 12, Line 50, Change "atoms/cm.sup.2" to --atoms/cm$^2$--.

Column 12, Line 59, Change "1.times.10.sup.20" to --1x10$^{20}$--.

Column 12, Line 60, Change "1.times.10.sup.21" to --1x10$^{21}$--.

Column 12, Line 60, Change "atoms/cm.sup.3" to --atoms/cm$^3$--.

Column 13, Line 3, Change "1.times.10.sup.13" to --1x10$^{13}$--.

Column 13, Line 4, Change "atoms/cm.sup.2" to --atoms/cm$^2$--.

Column 13, Line 24, Change "110B" to --10B--.

Column 13, Line 42, Change "(B.sub.2H.sub.6)" to --(B$_2$H$_6$)--.

Column 13, Line 44, Change "2.times.10.sup.20/cm.sup.3" to --2x10$^{20}$/cm$^3$--.

Column 13, Line 45, Change "2.times.10.sup.21/cm.sup.3" to --2x10$^{21}$/cm$^3$--.

Column 13, Line 62, Change "700.degree." to --700°--.

Column 13, Line 63, Change "600.degree." to --600°--.

Column 13, Line 64, Change "500.degree" to --500°--.

Column 14, Line 4, Change "450.degree." to --450°--.

Column 14, Line 18, Change "SiO.sub.2" to --SiO$_2$--.

Column 14, Line 18, Change "(PCVD-SiO.sub.2)" to --(PCVD-SiO$_2$)--.

Column 15, Line 53, Change "ClF.sub.3" to --ClF3--.

Column 15, Line 67, Change "193" to --19B--.

Column 16, Line 34, Change "180.degree." to --180°.--.

Column 16, Line 59, Change "15S" to --15A--.

Column 18, Line 55-56, Change "Dec. 19>2003," to --Dec. 19, 2003,--.